United States Patent
Lee et al.

(10) Patent No.: US 12,127,185 B2
(45) Date of Patent: Oct. 22, 2024

(54) METHOD AND DEVICE FOR PERFORMING SIDELINK RETRANSMISSION IN WIRELESS COMMUNICATION SYSTEM

(71) Applicant: LG Electronics Inc., Seoul (KR)

(72) Inventors: Seungmin Lee, Seoul (KR); Hanbyul Seo, Seoul (KR); Giwon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 467 days.

(21) Appl. No.: 17/599,840

(22) PCT Filed: Mar. 30, 2020

(86) PCT No.: PCT/KR2020/004387
§ 371 (c)(1),
(2) Date: Sep. 29, 2021

(87) PCT Pub. No.: WO2020/204567
PCT Pub. Date: Oct. 8, 2020

(65) Prior Publication Data
US 2022/0174695 A1  Jun. 2, 2022

Related U.S. Application Data

(60) Provisional application No. 62/826,962, filed on Mar. 29, 2019, provisional application No. 62/826,973, filed on Mar. 29, 2019.

(51) Int. Cl.
*H04W 72/1263* (2023.01)
*H04W 92/18* (2009.01)

(52) U.S. Cl.
CPC ........ *H04W 72/1263* (2013.01); *H04W 92/18* (2013.01)

(58) Field of Classification Search
CPC .......................... H04W 72/1263; H04W 92/18
See application file for complete search history.

(56) References Cited

U.S. PATENT DOCUMENTS 11,234,237 B2 *   1/2022   Li ........................ H04L 1/1854
11,252,753 B2 *   2/2022   Chen .................... H04L 1/1887
(Continued)

FOREIGN PATENT DOCUMENTS

WO   WO2018/084673   5/2018
WO   WO2018/171540   9/2018

OTHER PUBLICATIONS

CMCC, "Discussion on HARQ feedback for NR V2X," R1-1902330, Presented at 3GPP TSG RAN WG1 #96, Athens, Greece, Feb. 25-Mar. 1, 2019, 4 pages.
(Continued)

*Primary Examiner* — Chandrahas B Patel
(74) *Attorney, Agent, or Firm* — Fish & Richardson P.C.

(57) ABSTRACT

A method by which a first device performs wireless communication is presented. The method can comprise the steps in which: a first device performs at least one sidelink transmission to a second device; negative acknowledgement (NACK) information related to the at least one sidelink transmission is received from the second device; and whether to transmit a message for requesting a retransmission resource is determined on the basis of a preset latency time threshold value and a remaining latency budget related to the at least one sidelink transmission.

14 Claims, 23 Drawing Sheets

(56) References Cited

U.S. PATENT DOCUMENTS

| | | | |
|---|---|---|---|
| 11,356,212 B2* | 6/2022 | Park | H04L 1/1896 |
| 11,641,570 B2* | 5/2023 | Wang | H04W 76/27 |
| | | | 370/329 |
| 2018/0279275 A1 | 9/2018 | Chen et al. | |

OTHER PUBLICATIONS

Intel Corporation, "Physical Layer Procedures for NR V2X Sidelink Design," R1-1903450, revision of R1-1902482, Presented at 3GPP TSG RAN WG1 RAN1#96, Athens, Greece, Feb. 25 to Mar. 1, 2019, 14 pages.
Samsung, "Considerations on Sidelink HARQ Procedure," R1-1902278, Presented at 3GPP TSG RAN WG1 #96, Athens, Greece, Feb. 25-Mar. 1, 2019, 11 pages.
Xiaomi Communications, "On HARQ operation for V2x communications," R1-1902711, Presented at 3GPP TSG RAN WG1 #96, Athens, Greece, Feb. 25-Mar. 1, 2019, 3 pages.
EP Extended European Search Report for European Application No. 20784127.1-1215, dated Dec. 16, 2022, 7 pages.

* cited by examiner

FIG. 4
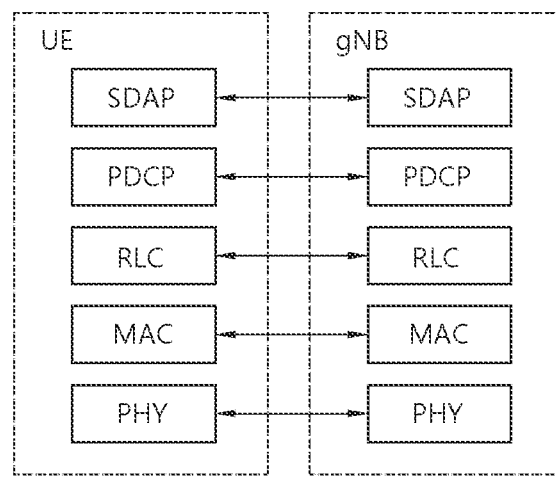
(a)
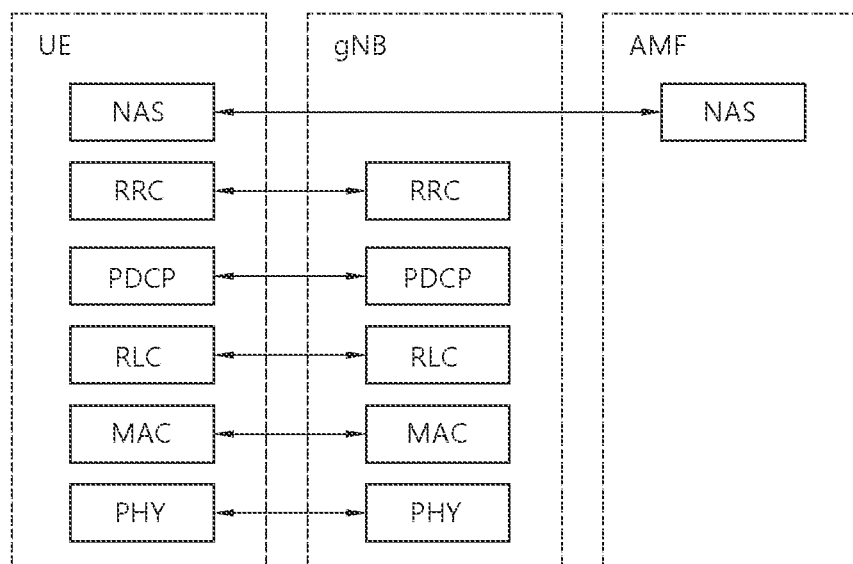
(b)

FIG. 8
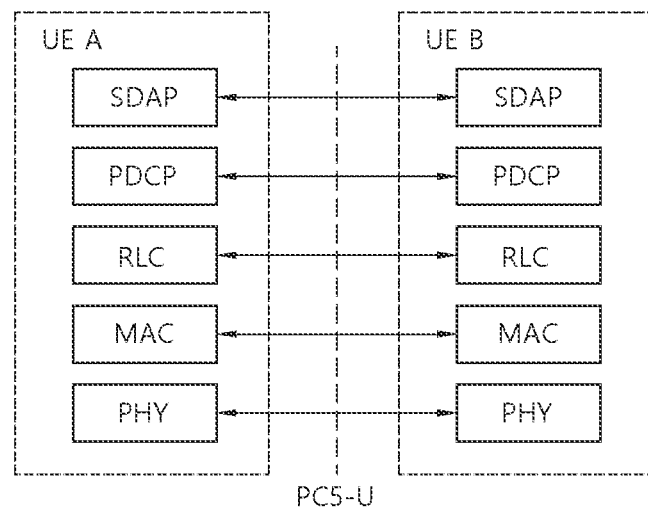
(a)
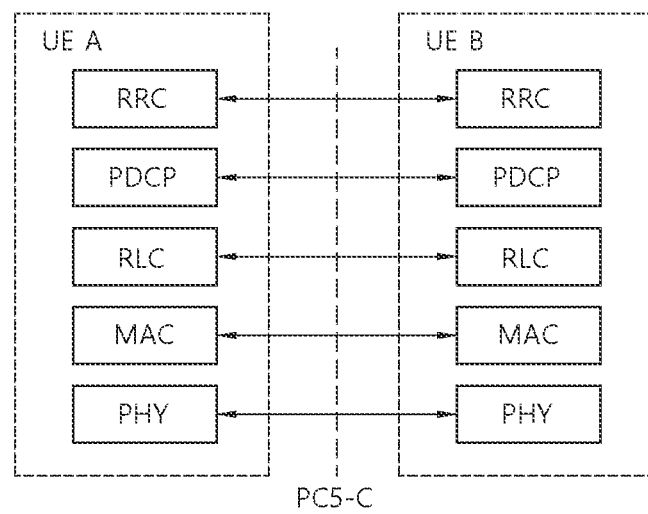
(b)

METHOD AND DEVICE FOR PERFORMING SIDELINK RETRANSMISSION IN WIRELESS COMMUNICATION SYSTEM

CROSS-REFERENCE TO RELATED APPLICATIONS

This application is a National Stage application under 35 U.S.C. § 371 of International Application No. PCT/KR2020/004387, filed on Mar. 30, 2020, which claims the benefit of U.S. Provisional Application No. 62/826,962, filed on Mar. 29, 2019, and U.S. Provisional Application No. 62/826,973, filed on Mar. 29, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in the case of a sidelink in the next communication system, at least two sidelink modes may be defined. For example, in the case of NR sidelink mode 1, the base station may schedule sidelink resources to be used by the UE for sidelink transmission. For example, in the case of NR sidelink mode 2, the UE may determine sidelink transmission resources within sidelink resources configured by the base station/network or pre-configured sidelink resources. The configured sidelink resources or the pre-configured sidelink resources may be a resource/resource pool. At this time, when the UE performs sidelink retransmission to another UE, the sidelink retransmission may be delayed due to a scheduling request and/or a buffer status report for receiving resource allocation from the base station.

Technical Solutions

In an embodiment, there is provided a method of performing wireless communication by a first apparatus 100. The method may include performing at least one sidelink transmission to a second device, receiving negative acknowledgment (NACK) information related to the at least one sidelink transmission from the second device, and determining whether to transmit a message for requesting retransmission resources based on a pre-configured delay time threshold and a remaining latency budget related to the at least one sidelink transmission.

Effects of the Disclosure

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
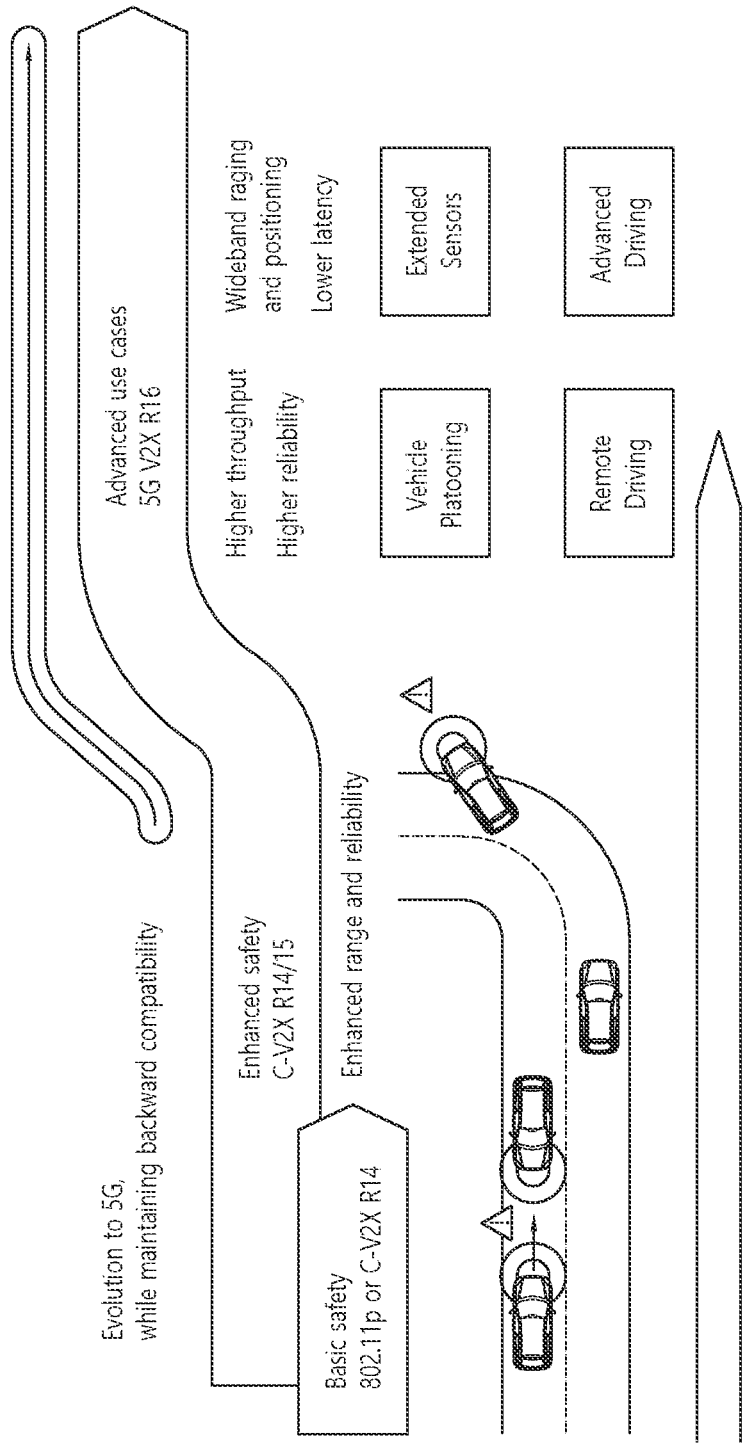
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
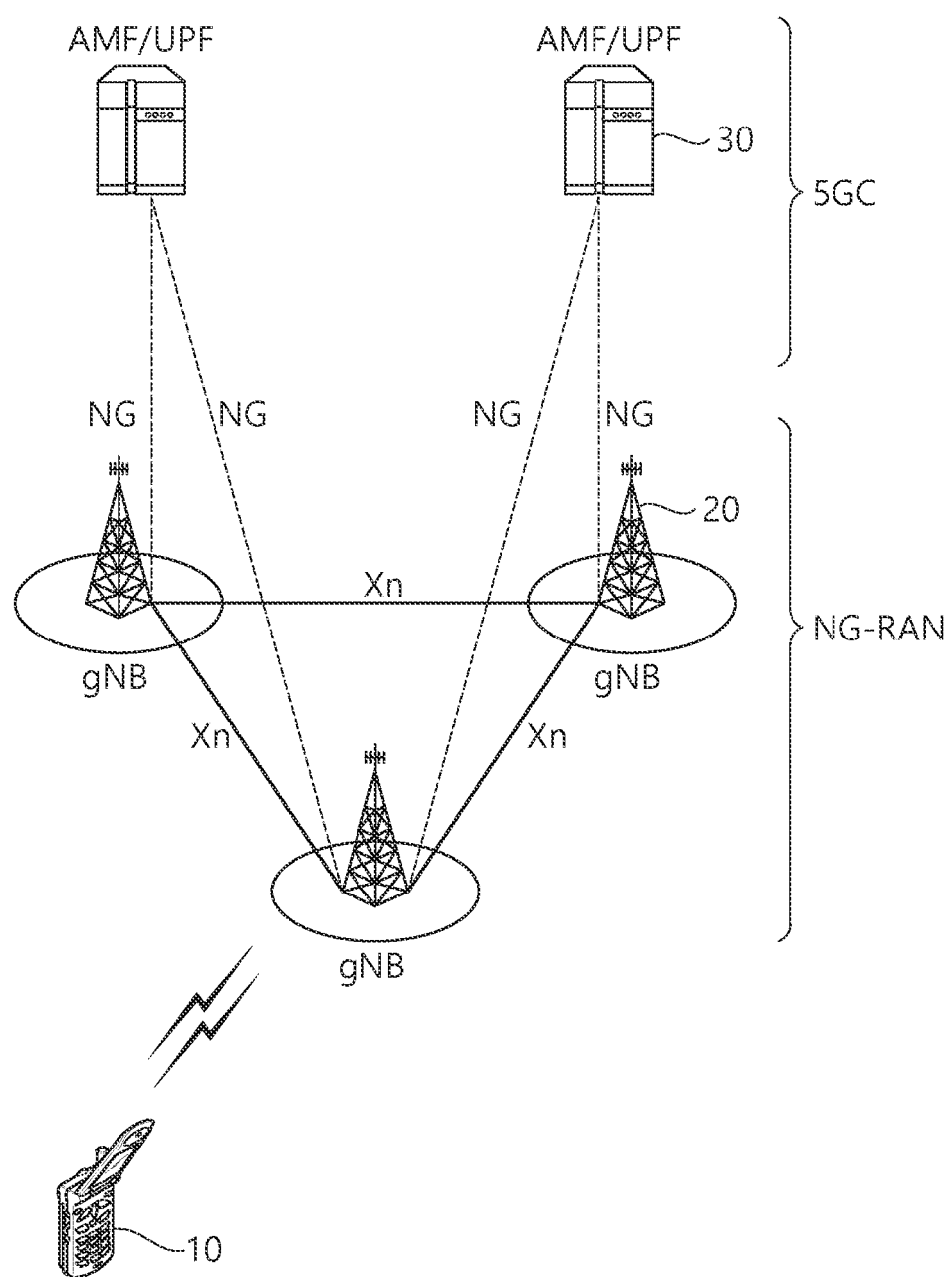
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
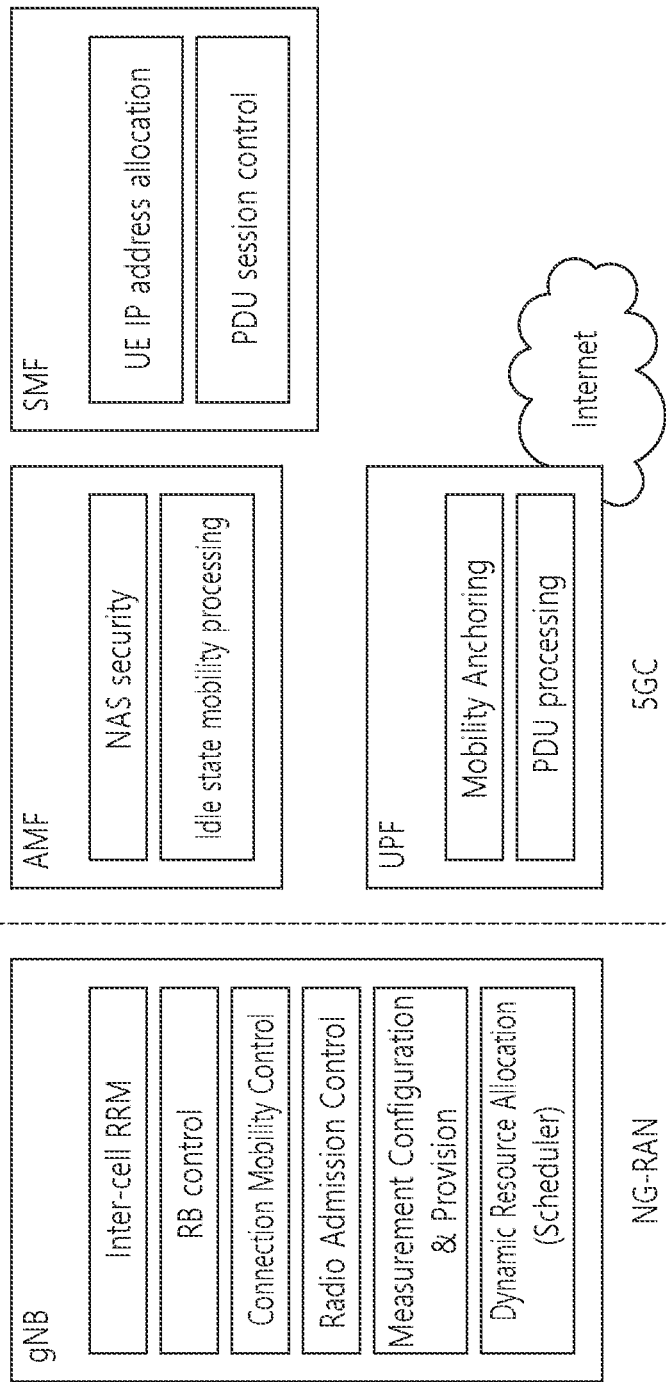
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
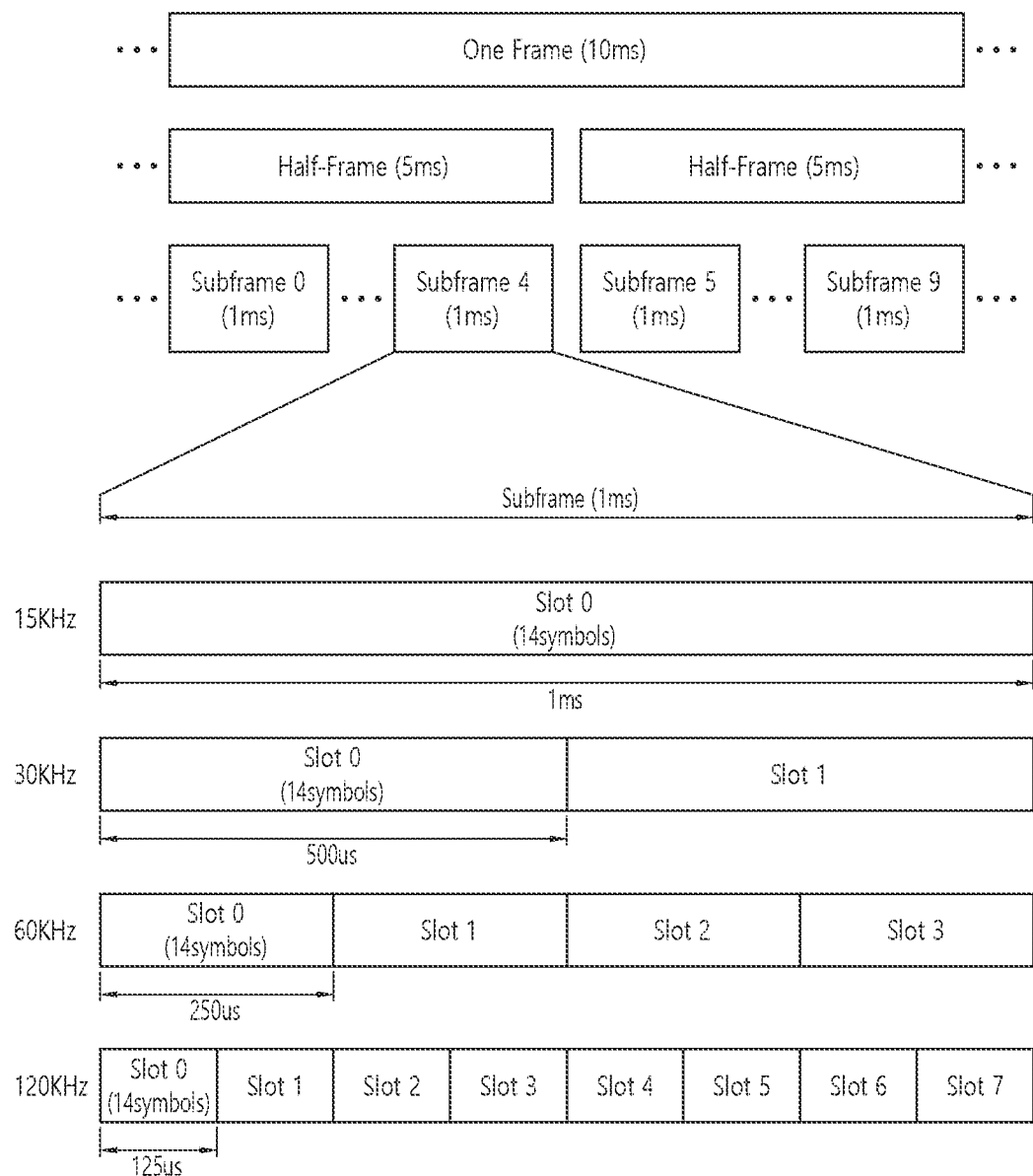
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
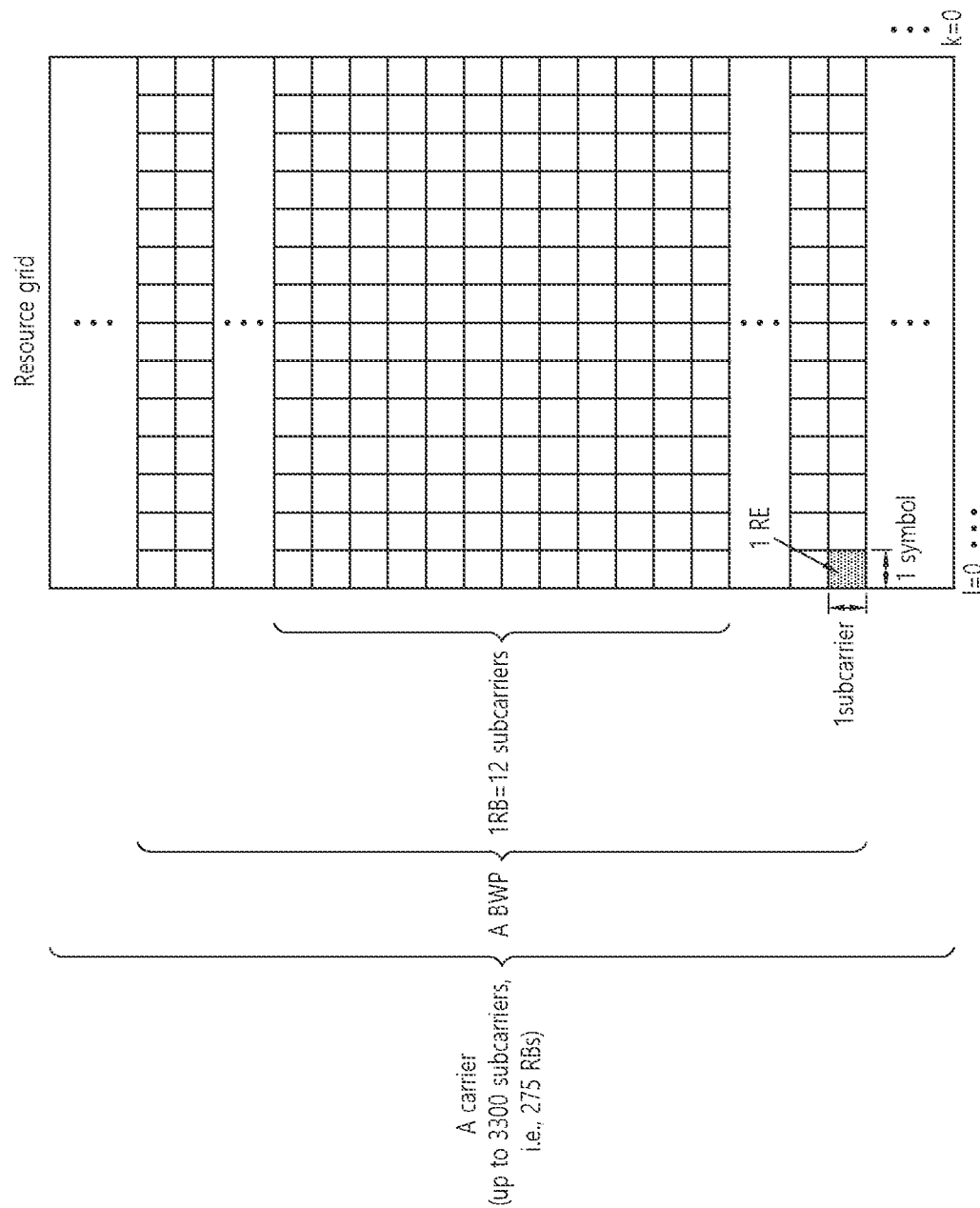
FIG. 6 shows a structure of a slot of an NR frame, in accordance with an embodiment of the present disclosure.

FIG. 6 shows a structure of a slot of an NR frame, in accordance with an embodiment of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
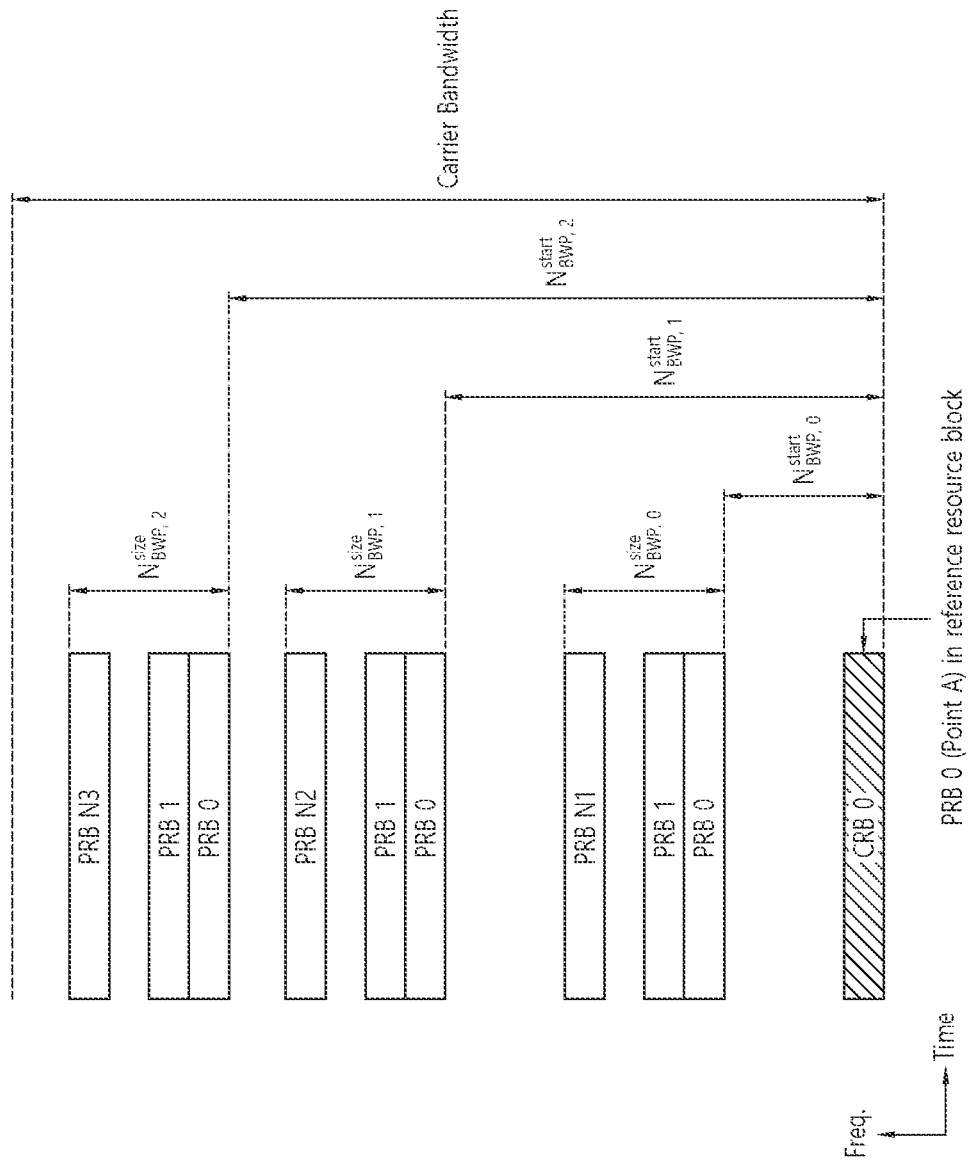
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8($a$) shows a user plane protocol stack, and FIG. 8($b$) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
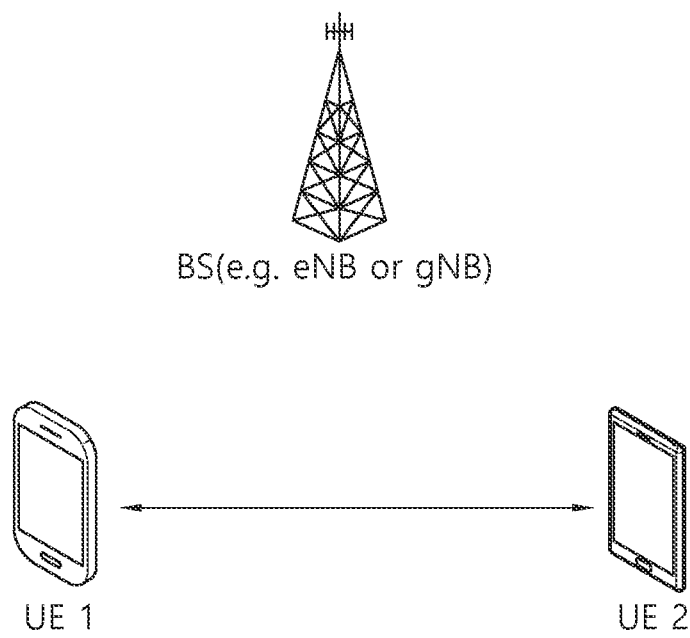
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
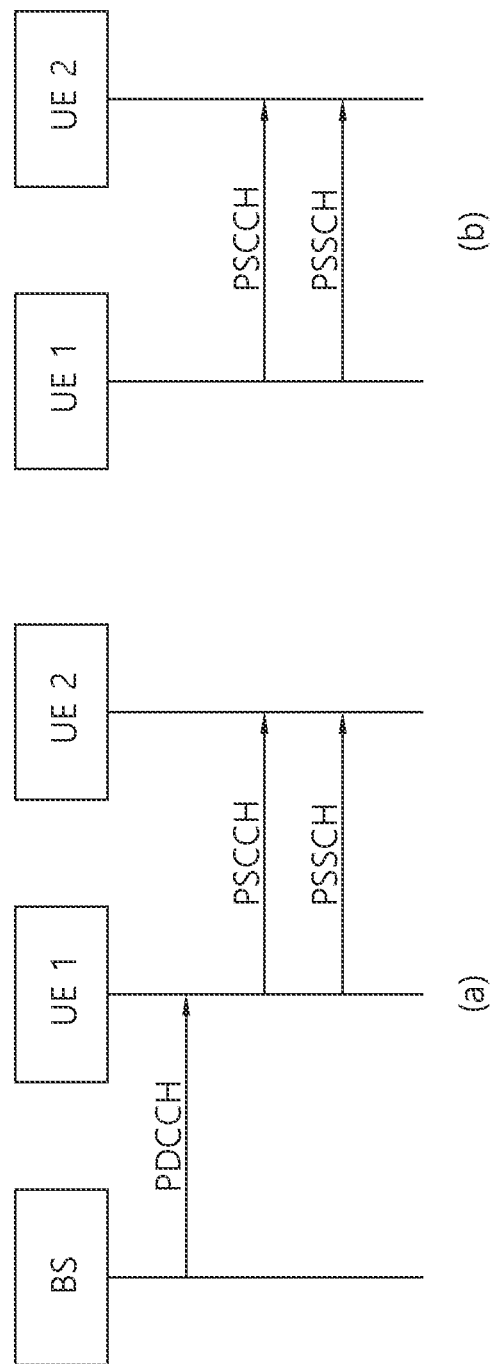
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
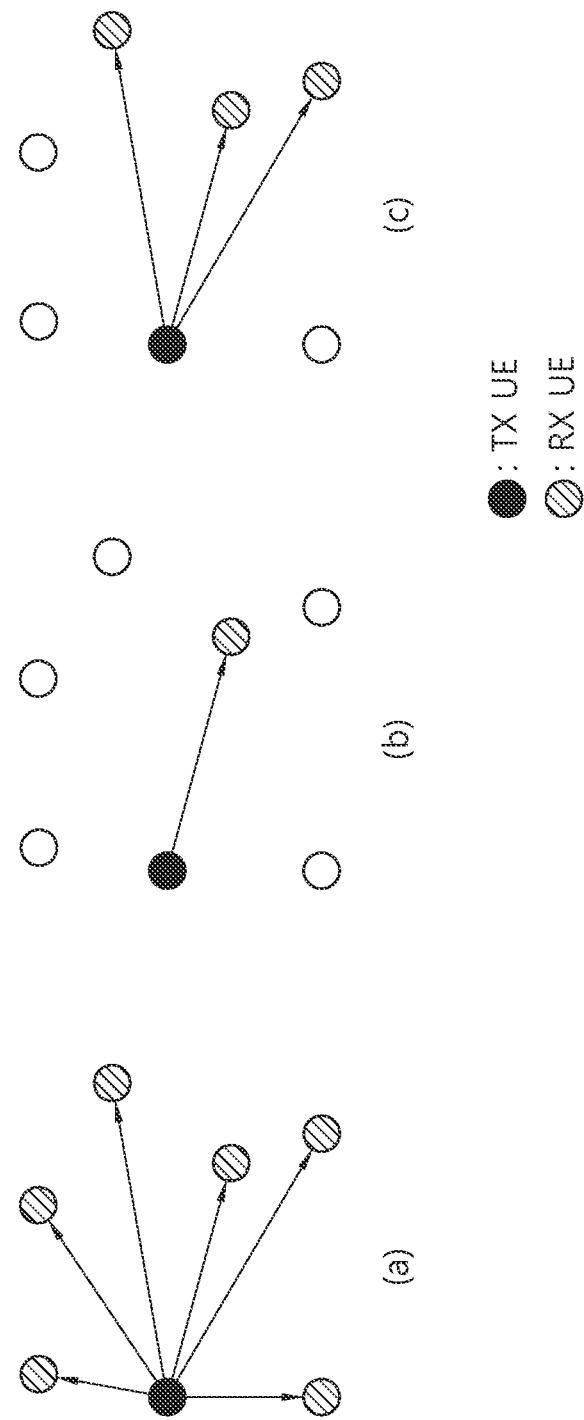
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the next-generation communication system, various use cases may be supported. For example, a service for communication such as an autonomous vehicle, a smart car, or a connected car may be considered. For this service, each vehicle can transmit and receive information as a communication terminal, select resources for communication with or without the base station's help depending on the situation, and send and receive messages between terminals.

Meanwhile, in the case of a sidelink in the next communication system, at least two sidelink modes may be defined. For example, in the case of NR sidelink mode 1, the base station may schedule sidelink resources to be used by the UE for sidelink transmission. For example, in the case of NR sidelink mode 2, the UE may determine sidelink transmission resources within sidelink resources configured by the base station/network or pre-configured sidelink resources. The configured sidelink resources or the pre-configured sidelink resources may be a resource/resource pool.

For example, when there is uplink data to be transmitted by the UE, a scheduling request for uplink communication of the UE may be a signal for the UE to request scheduling to the base station. In addition, for example, when there is sidelink data to be transmitted by the UE, a scheduling request for performing NR sidelink mode 1 communication of the UE may be a signal for the UE to request scheduling to the base station. For example, the base station receiving the scheduling request for uplink communication transmitted by the UE may transmit an uplink (UL) grant including uplink scheduling information to the UE through a PDCCH. The base station receiving the scheduling request for performing NR sidelink mode 1 communication transmitted by the UE may transmit sidelink resources including sidelink scheduling information to the UE through the PDCCH. For example, the UE receiving the uplink grant from the base station may transmit a PUSCH by using the uplink grant. The UE receiving the sidelink resources from the base station may perform sidelink communication using the sidelink resources. At this time, when a buffer status report (BSR) for uplink communication or a buffer status report for transmission for NR sidelink mode 1 communication is triggered, the base station may transmit an uplink grant for transmitting each buffer status report to the UE. The UE receiving the uplink grant for transmitting the buffer status report may transmit the buffer status report using the uplink grant.

Hereinafter, a method for a sidelink UE to perform retransmission and an apparatus supporting the same will be described.

For example, a transmitting UE performing NR sidelink mode 1 communication may transmit data to a receiving UE. The transmitting UE may receive a sidelink HARQ feedback information (e.g., ACK, NACK, etc.) for the data from the receiving UE. The transmitting UE may determine whether to re-transmit based on the received sidelink HARQ feedback information. When the transmitting UE receives a NACK from the receiving UE, the transmitting UE may request resource allocation for retransmission to the base station through the scheduling request and/or the buffer status report transmission. The scheduling request and buffer status report may be pre-configured for the above purpose.

According to an embodiment of the present disclosure, the base station may allocate an initial resource (IN_RSC) and N retransmission resources (RE_RSC) to a transmitting UE performing NR sidelink mode 1 communication. The resource allocation may be performed through predefined signaling. In this case, the transmitting UE may perform a data transmission operation or a retransmission operation according to various embodiments of the present disclosure. As an example, this embodiment may be extended even when the sum of the number of initial transmission resources and the number of retransmission resources allocated by the base station to the transmitting UE is N.

Figure 12:
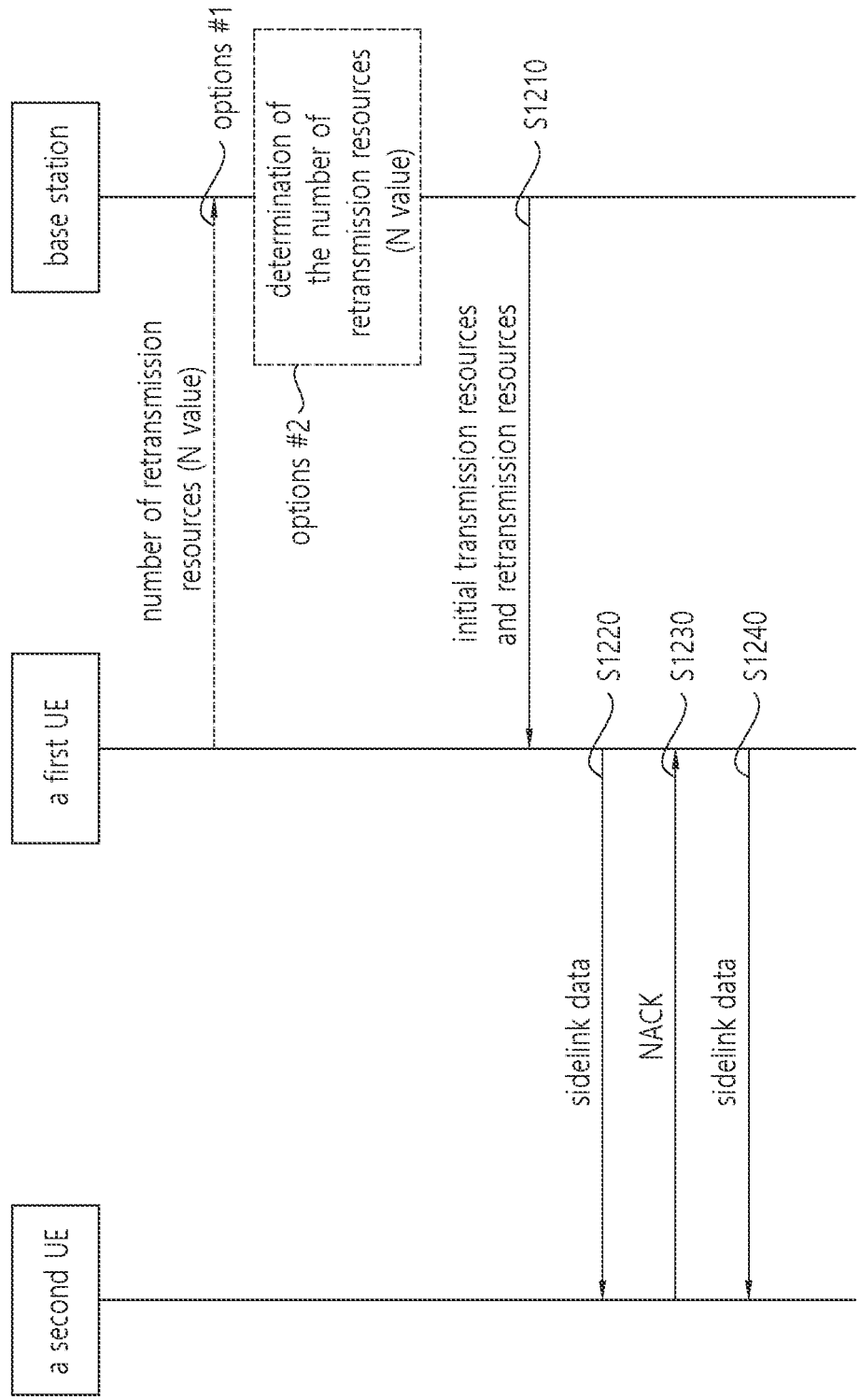
FIG. 12 shows a procedure for a UE to perform sidelink retransmission based on retransmission resources, in accordance with an embodiment of the present disclosure.

FIG. 12 shows a procedure for a UE to perform sidelink retransmission based on retransmission resources, in accordance with an embodiment of the present disclosure. The embodiment of FIG. 12 may be combined with various embodiments of the present disclosure.

Referring to FIG. 12, in step S1210, the first UE may be allocated IN_RSC and RE_RSC from the base station. For example, the first UE may receive information related to initial transmission resources and information related to retransmission resources from the base station. For example, the first UE may be a transmitting UE performing NR sidelink mode 1 communication, the second UE may be a receiving UE performing sidelink communication with the first UE. For example, when sidelink data to be transmitted from the first UE to the second UE is generated and a buffer state report (BSR) is triggered for the first UE, the first UE may transmit a scheduling request for data transmission to the base station. For example, the second UE may be a receiving UE that receives sidelink data from other UEs. Then, for example, the first UE may be allocated resources for the BSR from the base station, the first UE may transmit the BSR from the base station, and the first UE may be allocated resources for data transmission from the base station. For example, resources for data transmission may include IN_RSC and RE_RSC.

In step S1220, the first UE may transmit sidelink data to the second UE based on IN_RSC. For example, the first UE may transmit sidelink data to the second UE based on the information related to the initial transmission resources. For example, sidelink data may be included in sidelink information. For example, the sidelink information may include at least one of a sidelink message, a sidelink packet, a sidelink service, sidelink data, sidelink control information, and/or a sidelink transport block (TB).

In step S1230, the first UE may receive NACK information related to the sidelink data from the second UE. For example, the first UE may receive HARQ feedback information related to the sidelink data from the second UE. For example, the HARQ feedback information may include HARQ ACK or HARQ NACK.

In step S1240, the first UE may transmit sidelink data to the second UE based on the RE_RSC. For example, the first UE does not transmit a scheduling request and/or a buffer status report to the base station, and the first UE may transmit sidelink data to the second UE based on the RE_RSC.

For example, the first UE does not transmit a scheduling request and/or a buffer status report to the base station, the first UE may use the N RE_RSCs for retransmission purposes. For example, it may be applied when the first UE receives a NACK from the receiving UE. Herein, for example, the N value may be a value reported by the first UE to the base station through pre-defined signaling (option #1), based on at least one of sidelink channel state information, interference level information, congestion level information, sidelink reference signal received power (RSRP), sidelink reference signal received quality (RSRQ) and/or sidelink received signal strength indicator (RSSI). For example, the pre-defined signaling may include signaling through PUCCH/PUSCH, signaling through SR/BSR, signaling through MAC/RRC message, and signaling based on UE assistance information.

Alternatively, for example, the N value is a value derived/calculated by the base station based on at least one of sidelink RSRP, sidelink RSRQ, sidelink RSSI, and/or sidelink channel state information reported from the first UE (option #2).

For example, an operation in which the first UE reports the maximum number of retransmissions (MAX_RETXNUM) related to sidelink communication to the base station may be defined. For example, the value of MAX_RETXNUM may be the maximum possible or maximum required number of retransmissions. Herein, the sum of the number of transmissions including the initial transmission, N retransmissions, and N subsequent retransmissions must be less than or equal to the value of MAX_RETXNUM+1, and it must meet the latency budget requirements related to sidelink communication.

For example, the maximum N value that the base station can configure or the UE can request, or the maximum value of MAX_RETXNUM may be differently configured or limited according to type of services, priority of services, service requirements (e.g., latency, reliability), congestion level and/or interference level of a resource pool. For example, the minimum N value that the base station can configure or the UE can request, or the minimum value of MAX_RETXNUM may be differently configured or limited according to type of services, priority of services, service requirements (e.g., latency, reliability), congestion level and/or interference level of a resource pool.

For example, in the option #1, The N value reported by the first UE to the base station may be defined as the number of transmissions that can satisfy the target success probability of the sidelink service or the average number of transmission attempts until transmission success. For example, the N value may be the number of transmissions that can satisfy the target success probability of the sidelink service. For example, the N value may be the average number of transmission attempts until transmission success that can satisfy the target success probability of the sidelink service. For example, if the N value defined the number of transmissions that can satisfy the target success probability of the sidelink service is 4, it may mean that it is possible to achieve a target reliability of 99% when transmitting 4 times.

Figure 13:
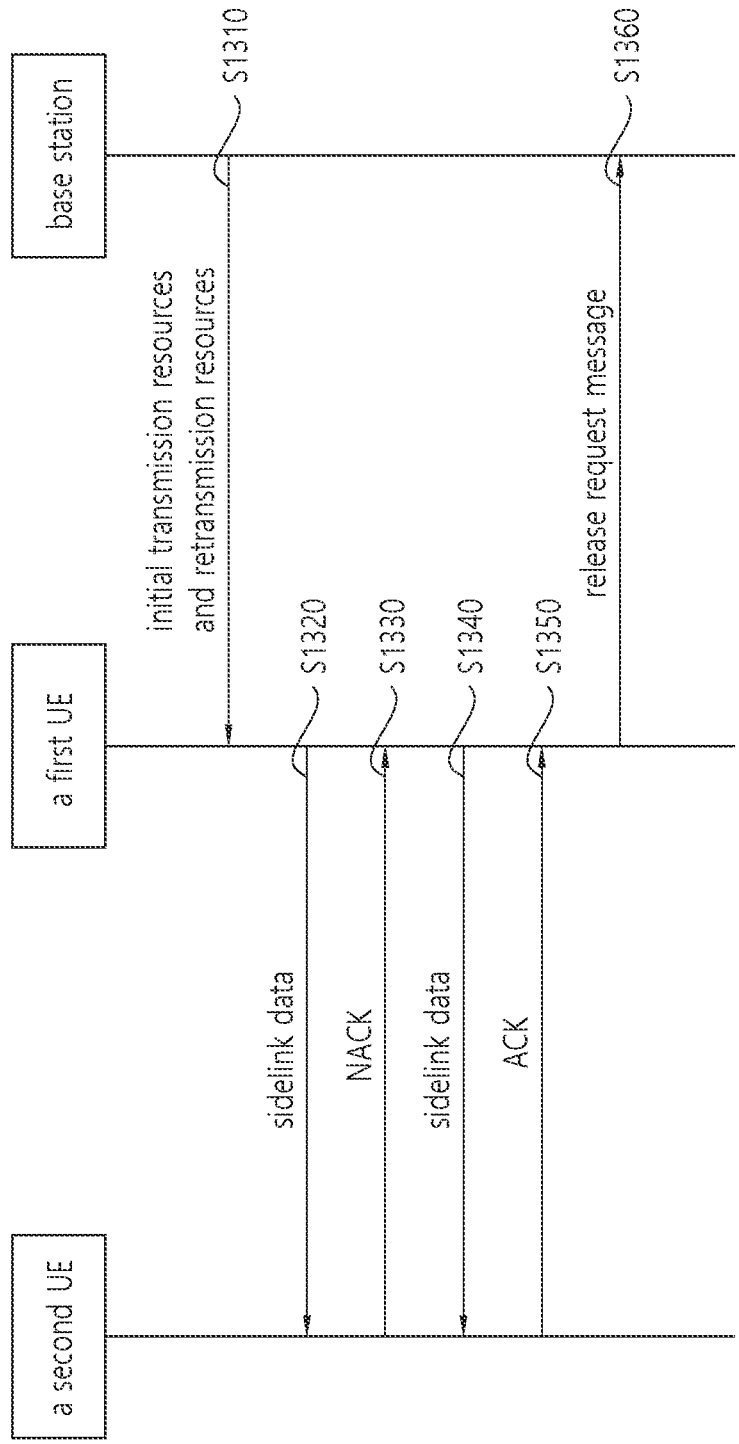
FIG. 13 shows a procedure for a UE to stop sidelink retransmission, in accordance with an embodiment of the present disclosure.

FIG. 13 shows a procedure for a UE to stop sidelink retransmission, in accordance with an embodiment of the present disclosure. The embodiment of FIG. 13 may be combined with various embodiments of the present disclosure.

Referring to FIG. 13, in step S1310, the first UE may be allocated IN_RSC and RE_RSC from the base station. For example, the first UE may receive information related to initial transmission resources and information related to retransmission resources from the base station.

In step S1320, the first UE may transmit sidelink data to the second UE based on IN_RSC. For example, the first UE may transmit sidelink data to the second UE based on the information related to the initial transmission resources. In step S1330, the first UE may receive NACK information related to the sidelink data from the second UE. In step S1340, the first UE may transmit the sidelink data to the second UE based on the RE_RSC. In step S1350, the first UE may receive ACK information from the second UE. For example, the ACK information may be ACK information received after the first UE performs retransmission using a number of RE_RSCS smaller than N.

In step S1360, the first UE may transmit a release request message to the base station. For example, the first UE may transmit a release request message to the base station based on the ACK information received from the second UE. For example, the first UE performs retransmission using a number of RE_RSCs smaller than N, the first UE may transmit a release request message to the base station based on receiving the ACK from the second UE. For example, the release request message may be a message for releasing the retransmission process for remaining RE_RSC. For example, the remaining RE_RSC may be a value obtained by subtracting the number of retransmissions performed for the second UE before the first UE receives the ACK information from the RE_RSC allocated to the first UE. For example, the release request message may be transmitted through pre-defined signaling. That is, the first UE performs retransmission using a number of RE_RSCS smaller than N, and the first UE may transmit a release request message to the base station through pre-defined signaling based on receiving the ACK from the second UE. For example, the first UE performs retransmission using a number of RE_RSCS smaller than N, the first UE may omit or not retransmit the retransmission operation on the remaining RE_RSC based on receiving the ACK from the second UE.

Figure 14:
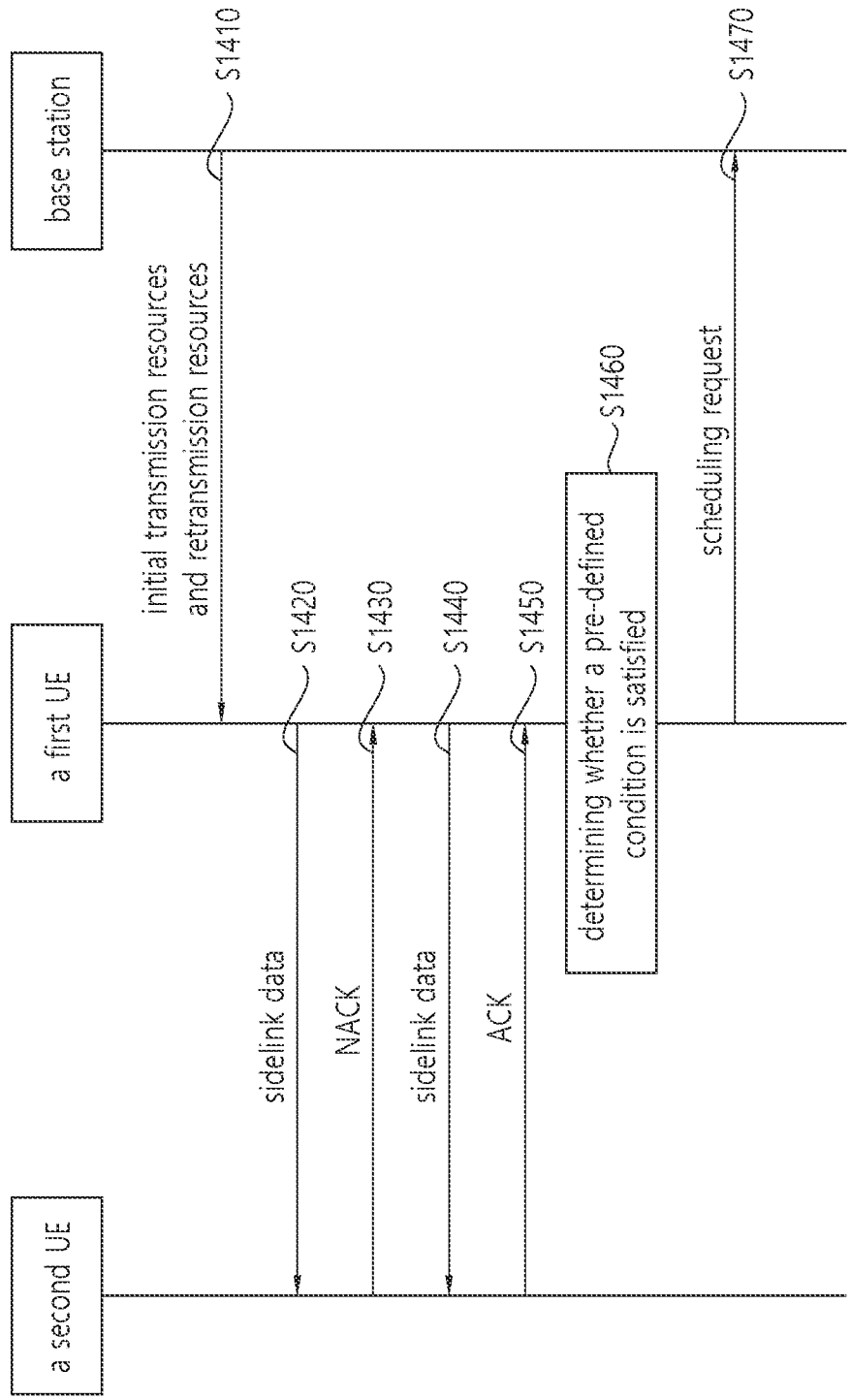
FIG. 14 shows a procedure in which the UE continues to perform sidelink retransmission, in accordance with an embodiment of the present disclosure.

FIG. 14 shows a procedure in which the UE continues to perform sidelink retransmission, in accordance with an embodiment of the present disclosure. The embodiment of FIG. 14 may be combined with various embodiments of the present disclosure.

Referring to FIG. 14, in step S1410, the first UE may be allocated IN_RSC and RE_RSC from the base station. For example, the first UE may receive information related to an initial transmission resources and information related to retransmission resources from the base station.

In step S1420, the first UE may transmit sidelink data to the second UE based on the IN_RSC. For example, the first UE may transmit sidelink data to the second UE based on the information related to the initial transmission resources. In step S1430, the first UE may receive NACK information related to the sidelink data from the second UE. In step S1440, the first UE may transmit the sidelink data to the second UE based on the RE_RSC. In step S1450, the first UE may receive NACK information from the second UE. For example, the NACK information may be NACK information received after the first UE performs retransmission using N RE_RSCs.

In step S1460, the first UE may determine whether to transmit a scheduling request to the base station based on a pre-defined condition. In step S1470, the first UE may transmit the scheduling request to the base station. For example, if the first UE satisfies the pre-defined condition, the first UE may request additional retransmission resource allocation through the scheduling request and/or buffer status report transmission. For example, if the latency budget is greater than a delay required for requesting and allocating retransmission resources through the scheduling request and/or buffer status report transmission, the pre-defined condition is satisfied. For example, if the remaining latency budget related to sidelink data/packet/service is greater than a delay required for requesting and allocating retransmission resources through the scheduling request and/or buffer status report transmission, the pre-defined condition is satisfied. For example, the remaining latency budget related to sidelink data/packet/service is greater than a pre-configured maximum delay required for requesting and allocating retransmission resources through the scheduling request and/or buffer status report transmission, the pre-defined condition is satisfied. For example, the remaining latency budget related to sidelink data/packet/service may be obtained by excluding a time between the time when the first UE performs initial sidelink data transmission and the time when the NACK information is received from the second UE from a total latency budget related to the sidelink data transmission of the first UE. For example, the first UE may transmit a scheduling request to the base station based on that the remaining latency budget related to the sidelink data is equal to or greater than a pre-configured delay time. For example, the first UE may transmit a scheduling request to the base station based on that the remaining latency budget related to the sidelink data is greater than a pre-configured delay time. For example, the pre-configured delay time may include a delay time required for requesting and allocating retransmission resources through the scheduling request and/or buffer status report transmission for the sidelink data.

For example, if the pre-defined condition is not satisfied, the first UE may stop or omit the retransmission operation. For example, if the predefined condition is not satisfied, the first UE may perform a retransmission operation based on NR sidelink mode 2. Alternatively, for example, based on receiving the NACK information from the second UE, the first UE may perform a retransmission operation based on the NR sidelink mode 2.

Alternatively, for example, based on receiving the NACK information from the second UE, it may be assumed that the HARQ operation in the MAC layer of the first UE is terminated, and an ARQ operation in the RLC layer is performed/started. Or, based on receiving the NACK information from the second UE, the HARQ operation in the MAC layer of the first UE may be terminated, and an ARQ operation in the RLC layer may be performed/started. For example, based on receiving the NACK information from the second UE, it may be assumed that the HARQ operation related to the sidelink data transmission in the MAC layer of the first UE is terminated, and an ARQ operation in the RLC layer is performed/started. Or, based on receiving the NACK information from the second UE, the HARQ operation related to the sidelink data transmission in the MAC layer of the first UE may be terminated, and an ARQ operation in the RLC layer may be performed/started.

According to an embodiment of the present disclosure, the retransmission operation based on the NR sidelink mode 2 of the first UE described above may be performed or allowed only when all or part of the following conditions are satisfied. For example, if all or part of the conditions below are not satisfied, the retransmission operation based on the NR sidelink mode 2 of the first UE may be omitted, or not performed, or may not be allowed. Herein, for example, the threshold value related to the following condition may be configured differently or defined based on at least one of a type of service, a priority of service, a service requirement (e.g., latency, reliability), a congestion level of a resource pool, and/or an interference level.

For example, if a channel busy ratio (CBR) measurement value is less than a pre-configured threshold, the first UE may perform a retransmission operation based on the NR sidelink mode 2. For example, if the CBR measurement value related to sidelink data transmission is less than a pre-configured threshold, the first UE may allocate resources related to sidelink transmission for the second UE, and the first UE may retransmit the sidelink data to the second UE through the allocated resources.

For example, when a remaining channel occupancy ratio (CR) measurement value related to NR sidelink mode 2 is greater than a pre-configured threshold value, the first UE may perform a retransmission operation based on the NR sidelink mode 2. For example, if the remaining CR measurement value related to sidelink data transmission is greater than a pre-configured threshold, the first UE may allocate resources related to sidelink transmission for the second UE, and the first UE may retransmit the sidelink data to the second UE through the allocated resources.

For example, when a sidelink RSRP measurement value is greater than a pre-configured threshold value, the first UE may perform a retransmission operation based on the NR sidelink mode 2. For example, if a RSRP measurement value related to sidelink data is greater than a pre-configured threshold, the first UE may allocate resources related to sidelink transmission for the second UE, and the first UE may retransmit the sidelink data to the second UE through the allocated resources.

For example, when a sidelink RSRQ measurement value is greater than a pre-configured threshold value, the first UE may perform a retransmission operation based on the NR sidelink mode 2. For example, if a RSRQ measurement value related to sidelink data is greater than a pre-configured threshold, the first UE may allocate resources related to sidelink transmission for the second UE, and the first UE may retransmit the sidelink data to the second UE through the allocated resources.

For example, when a sidelink CSI measurement value or a sidelink CSI report value is greater than a pre-configured threshold value, the first UE may perform a retransmission operation based on the NR sidelink mode 2. For example, if a CSI measurement value related to sidelink data or a CSI report value related to sidelink data is greater than a pre-configured threshold, the first UE may allocate resources related to sidelink transmission for the second UE, and the first UE may retransmit the sidelink data to the second UE through the allocated resources.

For example, when a sidelink RSSI measurement value is less than a pre-configured threshold value, the first UE may perform a retransmission operation based on the NR sidelink mode 2. For example, if a RSSI measurement value related to sidelink data is less than a pre-configured threshold, the first UE may allocate resources related to sidelink transmission for the second UE, and the first UE may retransmit the sidelink data to the second UE through the allocated resources.

For example, when a sidelink interference measurement value is less than a pre-configured threshold value, the first UE may perform a retransmission operation based on the NR sidelink mode 2. For example, if an interference measurement value related to sidelink data is less than a pre-configured threshold, the first UE may allocate resources related to sidelink transmission for the second UE, and the first UE may retransmit the sidelink data to the second UE through the allocated resources.

According to an embodiment of the present disclosure, transmission power parameters/values in INI_RSC and N RE_RSCS (e.g., a P-O related to OLPC (Open-loop power control), an alpha related to OLPC, maximum allowable power or minimum allowable power value) may be configured differently from transmission power parameters/values in retransmission resources after INI_RSC and RE_RSC. For example, in order to increase the data transmission success rate during initial transmission and N retransmissions, the transmission power parameters/values in INI_RSC and N RE_RSCS may be configured to be relatively higher than the transmission power parameters/values in retransmission resources after INI_RSC and RE_RSC. For example, transmission schemes (e.g., Transmission diversity/Closed-loop MIMO technique, beamforming, etc.) in INI_RSC and N RE_RSC may be configured differently from transmission schemes in the retransmission resource after INI_RSC and RE_RSC.

According to an embodiment of the present disclosure, for up to N retransmissions, the first UE may request retransmission resource allocation to the base station through a scheduling request and/or buffer status report transmission, and for retransmissions after N times, the first UE may request the base station to allocate retransmission resources through a scheduling request and/or buffer status report transmission. Thereafter, the base station additionally may allocate K retransmission resources and the first UE does not transmit a scheduling request and/or a buffer status report, the first UE may perform retransmission using the K retransmission resources. For example, the maximum value of N, the minimum value of N, or the value of K may be configured differently according to a type of service, a priority of the service, a service requirements (e.g., latency, reliability), a congestion level of a resource pool and/or an interference level, etc. For example, the K retransmission resources may be configured within a remaining latency budget related to a sidelink service.

According to an embodiment of the present disclosure, when the first UE performs an initial transmission and the first UE needs to perform a serving cell handover before performing retransmission in a situation in which a NACK is received from the second UE, the first UE may perform retransmission based on the NR sidelink mode 2.

In the present disclosure, the retransmission based on the NR sidelink mode 2 may mean an operation of retransmission related to a specific transport block (TB) through the resource after the transmitting UE reserves/selects resources for which relatively low interference is measured through a sensing operation (an operation of the UE independently in a resource pool).

Hereinafter, according to an embodiment of the present disclosure, a method of performing sidelink communication by a UE receiving a sidelink mode 1 operation and a sidelink mode 2 operation simultaneously, and an apparatus supporting the same will be described.

According to an embodiment of the present disclosure, in the case of a UE being configured to sidelink (SL) MODE 1/2 operation simultaneously, for efficient operation of SL MODE 1/2 resources and/or efficient sharing of SL MODE 1/2 resources for packet transmission related to a specific service, it may be performed or defined based on all or part of the embodiments proposed below. For example, the sidelink mode 1 operation may mean a case in which the base station directly schedules resources related to sidelink transmission of the UE through pre-defined signaling (e.g., DCI). For example, the sidelink mode 2 operation may mean a case in which the UE independently selects resources related to sidelink transmission from a pre-configured resource pool. Herein, for example, the pre-configured resource pool may be a pre-configured resource pool from a base station or a network. For example, in the present disclosure, the UE configured to operate in sidelink mode 1/2 (hereinafter, M1/2_UE) may mean a UE configured by a base station or a network to simultaneously operate in sidelink mode 1 and sidelink mode 2. For example, simultaneous configuration of sidelink mode 1/2 operation may be performed/specified for the same resource pool and/or carrier.

Figure 15:
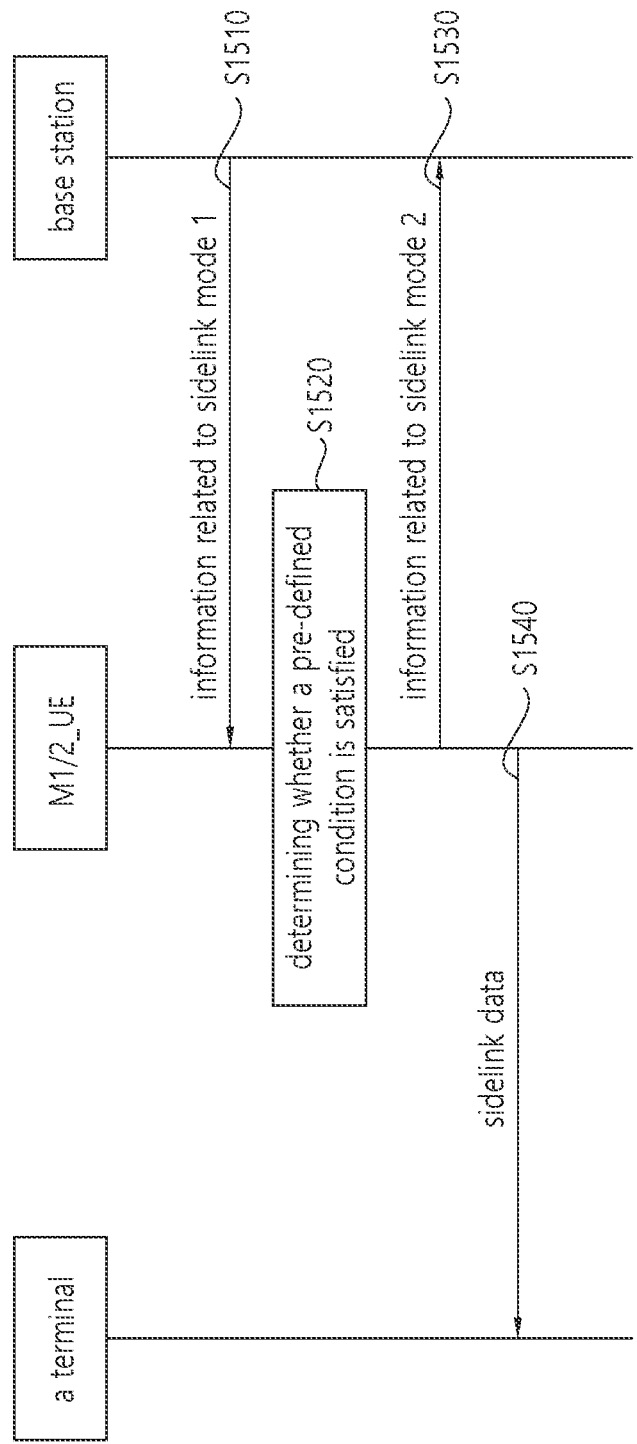
FIG. 15 shows a procedure for performing sidelink communication by a UE that is simultaneously configured with sidelink resource allocation mode 1 and sidelink resource allocation mode 2, in accordance with an embodiment of the present disclosure.

FIG. 15 shows a procedure for performing sidelink communication by a UE that is simultaneously configured with sidelink resource allocation mode 1 and sidelink resource allocation mode 2, in accordance with an embodiment of the present disclosure. The embodiment of FIG. 15 may be combined with various embodiments of the present disclosure.

Referring to FIG. 15, in step S1510, the M1/2_UE may receive information related to sidelink mode 1 from the base station. For example, the M1/2_UE may receive information related to sidelink mode 1 from the base station before being allocated resources from the base station in sidelink mode 1. For example, the information related to sidelink mode 1 may include at least one of time interval information in which the sidelink mode 1 resources are maintained, timer information in which the sidelink mode 1 resources are maintained, information on the number of sidelink mode 1 resources (e.g., information on how many times the sidelink mode 1 resources are maintained/repeated based on a specific period), priority information of sidelink mode 1 resources.

According to an embodiment of the present disclosure, the base station may transmit at least one of time interval information in which the sidelink mode 1 resources are maintained, timer information in which the sidelink mode 1 resources are maintained, information on the number of sidelink mode 1 resources (e.g., information on how many times the sidelink mode 1 resources are maintained/repeated based on a specific period), or priority information of sidelink mode 1 resources to the M/12_UE through pre-defined signaling. For example, the sidelink mode 1 resources may include resources scheduled by the base station for M1/2_UE in sidelink mode 1. Herein, for example, the M1/2_UE receiving the above-described information may determine how long the base station maintains the sidelink mode 1 resources in the time domain. In addition, when performing a sensing operation related to sidelink mode 2 and/or when selecting/reserving resources related to sidelink mode 2, the M1/2_UE may avoid overlapping the sidelink mode 1 resources in a time resource domain and/or a frequency resource domain. Or, for example, the M1/2_UE assumes that the sidelink mode 1 resources are maintained for an infinite time period or that the number of sidelink mode 1 resources is infinite, and the M1/2_UE may perform the sensing operation related to sidelink mode 2 and/or the sidelink mode 2 resources selection/reservation operation. For example, the sidelink mode 2 resources may include resources allocated by the M1/2_UE to perform sidelink communication with another UE in sidelink mode 2.

In step S1520, the M1/2_UE may determine whether a pre-defined condition is satisfied, and switch the resource allocation mode according to the determination. For example, the M1/2_UE may determine whether a pre-defined condition is satisfied based on the information related to sidelink mode 1. For example, the M1/2_UE may switch the resource allocation mode based on the pre-defined condition. For example, whether a pre-defined condition is satisfied may be determined based on at least one of a priority of packet transmitted through sidelink mode 1 resources, a priority of packet transmitted through sidelink mode 2 resources, requirements related to transmission packet on sidelink mode 1 resources, requirements related to transmission packet on sidelink mode 2 resources, a latency budget of packet transmitted through the sidelink mode 1 resources, or a congestion/interference level on a resource pool. In FIG. 15, it is assumed that the M1/2_UE switches from sidelink mode 1 to sidelink mode 2 based on a pre-defined condition.

In step S1530, the M1/2_UE may transmit information related to sidelink mode 2 to the base station. For example, the M1/2_UE may transmit information related to sidelink mode 2 to the base station based on switching the resource allocation mode. For example, the information related to sidelink mode 2 may include at least one of priority information related to resources allocated to sidelink mode 2, priority information of a transmission service/packet related to resources allocated to sidelink mode 2, counter information, reservation period information, sub-frame offset information, transmission power value information, or resource information related to preferred sidelink mode 1 from the M1/2_UE point of view. In step S1540, M1/2_UE may allocate resources in sidelink mode 2, and M1/2_UE may transmit sidelink data to another UE through the allocated resources.

According to an embodiment of the present disclosure, the M1/2_UE may report all or part of the following information to the base station through a pre-defined signal. For example, as a result of the sensing, M1/2_UE may transmit at least one of priority information related to resources allocated to sidelink mode 2, priority information of a transmission service/packet related to resources allocated to sidelink mode 2, counter information, reservation period information, sub-frame offset information, transmission power value information, or resource information related to preferred sidelink mode 1 from the M1/2_UE point of view to the base station. For example, the counter information may include counter information selected when reserving/selecting sidelink mode 2 resources. For example, the resource information related to sidelink mode 1 preferred from the viewpoint of the M1/2_UE may be determined based on a time/frequency location of the reserved/selected sidelink mode 2 resources as a result of sensing resources by the M1/2_UE.

For example, the base station receiving the sensing result from the M1/2_UE may select/reserve resources with relatively little interference as sidelink mode 1 resources. In addition, for example, the base station may avoid the sidelink mode 2 resources selected/reserved by the M1/2_UE on a time resource domain and/or a frequency resource domain, and may select/reserve the sidelink mode 1 resources.

Herein, for example, it may be assumed that the sidelink mode 2 resources reserved/selected by the M1/2_UE performing the sensing operation are maintained by a pre-selected counter or number of times. Or, for example, it may be assumed that the sidelink mode 2 resources are maintained for a configured time interval or a configured timer from the base station/network.

Alternatively, for example, it may be assumed that the sidelink mode 2 resources are maintained for an infinite time period. Or, for example, it may be assumed that the number of reserved/selected sidelink mode 2 resources is infinite for the sidelink mode 2 resources.

For example, a probabilistic determination for determining whether to perform reselection/reservation for sidelink mode 2 resources may be performed in advance. That is, the M1/2_UE may perform probabilistic determination in advance to determine whether to perform reselection/reservation for the sidelink mode 2 resources. For example, after M1/2_UE chooses a random value (e.g., a real value) between 0 and 1, if the selected value is greater than a pre-configured threshold, M1/2_UE may perform reselection/reservation for sidelink mode 2 resources. For example, if it is determined to perform reselection/reservation for the sidelink mode 2 resources, it may be assumed that the reserved/selected sidelink mode 2 resources are maintained by a pre-selected counter or number of times. For example, the pre-selected counter or number of times may be a counter or number of times selected during reservation/selection of previously sidelink mode 2 resources. For example, if it is not determined to perform reselection/reservation for sidelink mode 2 resources, until it is determined that resource reselection/reservation for sidelink mode 2 resources is performed, it may be assumed that reserved/selected sidelink mode 2 resources are maintained.

For example, due to the transmission operation using the sidelink mode 1 resources, M1/2_UE may perform/apply a sensing operation for resources that are not actually used among the reserved/selected sidelink mode 2 resources. Or, for example, due to the transmission operation using the sidelink mode 1 resources, the M1/2_UE may not perform/apply a sensing operation on resources that are not actually used among reserved/selected sidelink mode 2 resources.

According to an embodiment of the present disclosure, when a specific condition is satisfied, the M1/2_UE may transmit a packet of a specific service priority and/or a packet of a specific service requirement transmitted through the sidelink mode 1 resources through the sidelink mode 2 resources.

For example, when a sensing operation for M1/2_UE to reserve/select sidelink mode 2 resources, if the assumed priority is equal to or higher than the priority of the packet transmitted through the sidelink mode 1 resources, the M1/2_UE may transmit the packet transmitted through the sidelink mode 1 resources through the sidelink mode 2 resource. For example, when a sensing operation for M1/2_UE to reserve/select sidelink mode 2 resources, if the assumed service priority is equal to or higher than a pre-configured threshold, the M1/2_UE may transmit the packet transmitted through the sidelink mode 1 resources through the sidelink mode 2 resources. For example, if the priority of the resources for reservation/selection by the M1/2_UE in sidelink mode 2 is equal to or higher than the priority of the packet transmitted through the sidelink mode 1 resources, the M1/2_UE may transmit sidelink information transmitted through the sidelink mode 1 resource to another UE through the sidelink mode 2 resources.

For example, when a requirement (e.g., latency budget, reliability, priority) related to a transmission packet on sidelink mode 2 resources is the same as or tighter than a requirement related to a transmission packet on sidelink mode 1 resources, the M1/2_UE may transmit the packet transmitted through the sidelink mode 1 resources through the sidelink mode 2 resources. For example, when a requirement (e.g., latency budget, reliability, priority) related to a transmission packet on sidelink mode 2 resources is the same as or tighter than a pre-configured value/level, the M1/2_UE may transmit the packet transmitted through the sidelink mode 1 resources through the sidelink mode 2 resources.

For example, if the sidelink mode 2 resources are within a latency budget of a packet transmitted through the sidelink mode 1 resources, the M1/2_UE may transmit the packet transmitted through the sidelink mode 1 resources through the sidelink mode 2 resources. For example, if reserved/selected sidelink mode 2 resources exist within a remaining latency budget of a packet transmitted through the sidelink mode 1 resources, the M1/2_UE may transmit the packet transmitted through the sidelink mode 1 resources through the sidelink mode 2 resources.

For example, when a congestion/interference level on a resource pool is lower than a pre-configured threshold, the M1/2_UE may transmit a packet transmitted through the sidelink mode 1 resources through the sidelink mode 2 resources.

According to an embodiment of the present disclosure, there may not be reserved/selected sidelink mode 2 resources that satisfies the specific conditions described above for transmitting a packet of a specific service priority and/or a packet of a specific service requirement transmitted through sidelink mode 1 resources through sidelink mode 2 resources. For example, when the M1/2_UE cannot transmit a packet of a specific service priority and/or a packet of a specific service requirement transmitted through the sidelink mode 1 resources through previously reserved/selected sidelink mode 2 resources, the M1/2_UE may re-reserve/select sidelink mode 2 resources. Or, for example, when the M1/2_UE cannot transmit a packet of a specific service priority and/or a packet of a specific service requirement transmitted through the sidelink mode 1 resources through previously reserved/selected sidelink mode 2 resources, the M1/2_UE may transmit an indicator to the base station to induce re-reservation/selection of sidelink mode 1 resources. Herein, for example, when the M1/2_UE performs sensing to re-reserve/select sidelink mode 2 resources, the M1/2_UE may perform the sensing based on the service priority related to the packet transmitted through the sidelink mode 1 resources. For example, when the M1/2_UE performs sensing to re-reserve/select sidelink mode 2 resources, the M1/2_UE may perform the sensing based on the higher priority among the service priority related to the packet transmitted through the previously reserved/selected sidelink mode 2 resources and the service priority related to the packet transmitted through the sidelink mode 1 resources. For example, when the M1/2_UE performs sensing to re-reserve/select sidelink mode 2 resources, the M1/2_UE may perform the sensing based on a pre-configured service priority. For example, the pre-configured service priority may be a pre-configured service priority from the base station/network.

In various embodiments of the present disclosure described above, only retransmission of a packet transmitted through the sidelink mode 1 resources may be to be transmitted through the reserved/selected sidelink mode 2 resources. For example, in order to retransmit a packet transmitted through the sidelink mode 1 resources through the sidelink mode 2 resources, the M1/2_UE may switch the resource allocation mode.

According to an embodiment of the present disclosure, the sidelink mode 1 resources scheduled by the base station and sidelink mode 2 resources selected/reserved by the UE may not overlap in a frequency resource domain, and all or some may overlap in a time resource domain (e.g., when FDM is applied). Or, for example, the sidelink mode 1 resources scheduled by the base station and the sidelink mode 2 resources selected/reserved by the UE may all or partly overlap in the time resource domain/frequency resource domain. In this case, for example, it may be configured for M1/2_UE to preferentially use sidelink mode 1 resources. Or, for example, it may be configured for M1/2_UE to preferentially use sidelink mode 2 resources. For example, it is assumed that the resources on the non-priority mode is not valid, the M1/2_UE may omit packet transmission through the resources in the non-priority mode. Or, for example, it may be configured for M1/2_UE to preferentially use resources on a pre-signaled mode. For example, the pre-signaled mode may be a pre-signaled resource allocation mode from the base station/network. Or, for example, it may be configured for M1/2_UE to preferentially use resources on which packet transmission of a relatively high service priority is performed. For example, it may be configured for M1/2_UE to preferentially use resources on which packet transmission with relatively tight service requirements (e.g., low latency budget, high reliability and/or priority) is performed. For example, a service priority or service requirement value related to resources at a time point when packet transmission does not exist may be pre-configured for the M1/2_UE from the base station/network.

Figure 16:
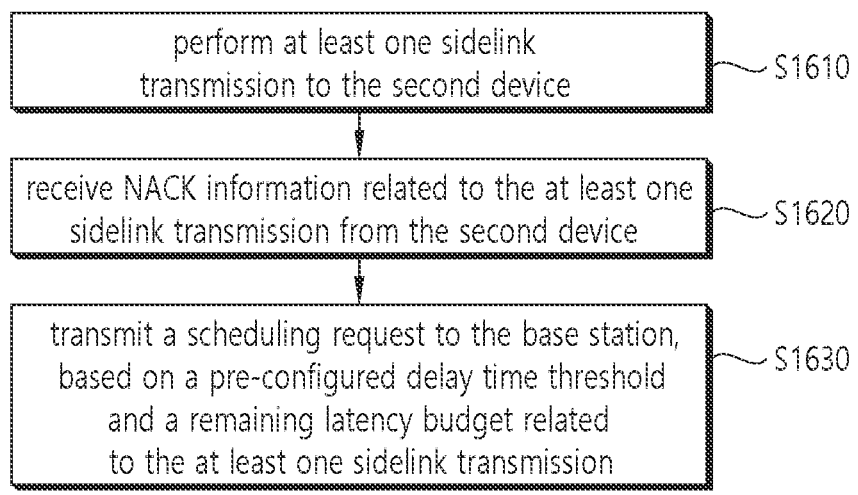
FIG. 16 shows a method for a first device 100 to perform sidelink retransmission to a second device 200 according to an embodiment of the present disclosure.

FIG. 16 shows a method for a first device 100 to perform sidelink retransmission to a second device 200 according to an embodiment of the present disclosure. The embodiment of FIG. 16 may be combined with various embodiments of the present disclosure.

Referring to FIG. 16, in step S1610, the first device 100 may perform at least one sidelink transmission to the second device 200. In step S1620, the first device 100 may receive negative acknowledgment (NACK) information related to the at least one sidelink transmission from the second device 200. In step S1630, the first device 100 may transmit a scheduling request to the base station, based on a pre-configured delay time threshold and a remaining latency budget related to the at least one sidelink transmission. For example, the pre-configured delay time may include a pre-configured delay time threshold value. For example, a message for requesting resources for retransmission may include the scheduling request. For example, the first device 100 may determine whether to transmit a message for requesting retransmission resources based on a pre-configured delay time threshold value and a remaining latency budget related to the at least one sidelink transmission.

For example, the remaining latency budget related to the at least one sidelink transmission may be greater than the pre-configured delay time threshold value. For example, the remaining latency budget related to the at least one sidelink transmission may be equal to or greater than the pre-configured delay time threshold value. For example, based on the remaining latency budget related to the at least one sidelink transmission being greater than the pre-configured delay time threshold, the first device 100 may transmit the message for requesting retransmission resources to the base station. For example, based on the remaining latency budget related to the at least one sidelink transmission being equal to or greater than the pre-configured delay time threshold, the first device 100 may transmit the message for requesting retransmission resources to the base station. For example, the pre-configured delay time threshold includes a minimum delay time required for requesting retransmission resources and allocating the retransmission resources.

For example, the remaining latency budget related to the at least one sidelink transmission may be less than the pre-configured delay time threshold value. For example, the remaining latency budget related to the at least one sidelink transmission may be equal to or less than the pre-configured delay time threshold value. For example, based on the remaining latency budget related to the at least one sidelink transmission being less than the pre-configured delay time threshold, the at least one sidelink transmission may be stopped. For example, based on the remaining latency budget related to the at least one sidelink transmission being equal to or less than the pre-configured delay time threshold, the at least one sidelink transmission may be stopped. In this case, for example, the first device 100 may determine not to transmit the message for requesting retransmission resources.

For example, based on the remaining latency budget related to the at least one sidelink transmission being equal to or less than a pre-configured threshold value, the first device 100 may perform a mode 2-based retransmission. For example, based on the remaining latency budget related to the at least one sidelink transmission being less than a pre-configured threshold value, the first device 100 may perform a mode 2-based retransmission. For example, the mode 2-based retransmission is performed based on resources allocated by the first device 100 for sidelink transmission to the second device 200. For example, based on a CBR measurement value related to the at least one sidelink transmission being less than a pre-configured threshold value, the mode 2-based retransmission may be performed. For example, based on a CBR measurement value related to the at least one sidelink transmission being equal to or less than a pre-configured threshold value, the mode 2-based retransmission may be performed. For example, based on a channel quality value related to the at least one sidelink transmission being greater than a pre-configured threshold value, the mode 2-based retransmission may be performed. For example, based on a channel quality value related to the at least one sidelink transmission being equal to or greater than a pre-configured threshold value, the mode 2-based retransmission may be performed. For example, the channel quality value may include at least one of reference signal received power (RSRP) related to the at least one sidelink transmission, reference signal received quality (RSRQ) related to the at least one sidelink transmission, received signal strength indicator (RSSI) related to the at least one sidelink transmission, channel state information report value related to the at least one sidelink transmission and/or channel state information measurement value related to the at least one sidelink transmission. For example, based on a channel quality value related to the at least one sidelink transmission being less than a pre-configured threshold value, the mode 2-based retransmission may be stopped. For example, based on a channel quality value related to the at least one sidelink transmission being equal to or less than a pre-configured threshold value, the mode 2-based retransmission may be stopped. For example, the message for requesting retransmission resources may be any one of the scheduling request or hybrid automatic repeat request (HARQ) NACK information received from the second device 200.

For example, the first device 100 may transmit first information related to retransmission to a base station. For example, the first information may include at least one of sidelink channel status information, interference level information, congestion level information, RSRP information related to the sidelink transmission, RSRQ information related to the sidelink transmission or RSSI information related to the sidelink transmission. For example, the first device 100 may receive information related to initial transmission resources and second information related to retransmission resources from the base station. For example, the first device 100 may perform the at least one sidelink transmission based on the information related to initial transmission resources and the second information related to retransmission resources. For example, the second information may include the number of retransmission resources determined based on the first information.

Alternatively, for example, the first device 100 may transmit the number of retransmission resources determined based on first information related to retransmission to the base station. For example, the first information may include at least one of sidelink channel status information, interference level information, congestion level information, RSRP information related to the sidelink transmission, RSRQ information related to the sidelink transmission or RSSI information related to the sidelink transmission. For example, the first device 100 may receive information related to initial transmission resources and second information related to retransmission resources from the base station. For example, the first device 100 may perform the at least one sidelink transmission based on the information related to initial transmission resources and the second information related to retransmission resources.

The above-described embodiment may be applied to various devices to be described below. First, for example, the processor 102 of the first device 100 may control the transceiver 106 to perform at least one sidelink transmission to the second device 200. And, the processor 102 of the first device 100 may control the transceiver 106 to receive negative acknowledgment (NACK) information related to the at least one sidelink transmission from the second device 200. And, the processor 102 of the first device 100 may control the transceiver 106 to transmit a scheduling request to the base station, based on a pre-configured delay time threshold and a remaining latency budget related to the at least one sidelink transmission.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: perform at least one sidelink transmission to a second device, receive negative acknowledgment (NACK) information related to the at least one sidelink transmission from the second device, and determine whether to transmit a message for requesting retransmission resources based on a pre-configured delay time threshold and a remaining latency budget related to the at least one sidelink transmission.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: perform at least one sidelink transmission to a second UE, receive negative acknowledgment (NACK) information related to the at least one sidelink transmission from the second UE, and determine whether to transmit a message for requesting retransmission resources based on a pre-configured delay time threshold and a remaining latency budget related to the at least one sidelink transmission.

According to an embodiment of the present disclosure, a non-transitory computer-readable storage medium storing instructions may be provided. For example, the instructions, when executed, cause a first device to: perform at least one sidelink transmission to a second device, receive negative acknowledgment (NACK) information related to the at least one sidelink transmission from the second device, and determine whether to transmit a message for requesting retransmission resources based on a pre-configured delay time threshold and a remaining latency budget related to the at least one sidelink transmission.

Figure 17:
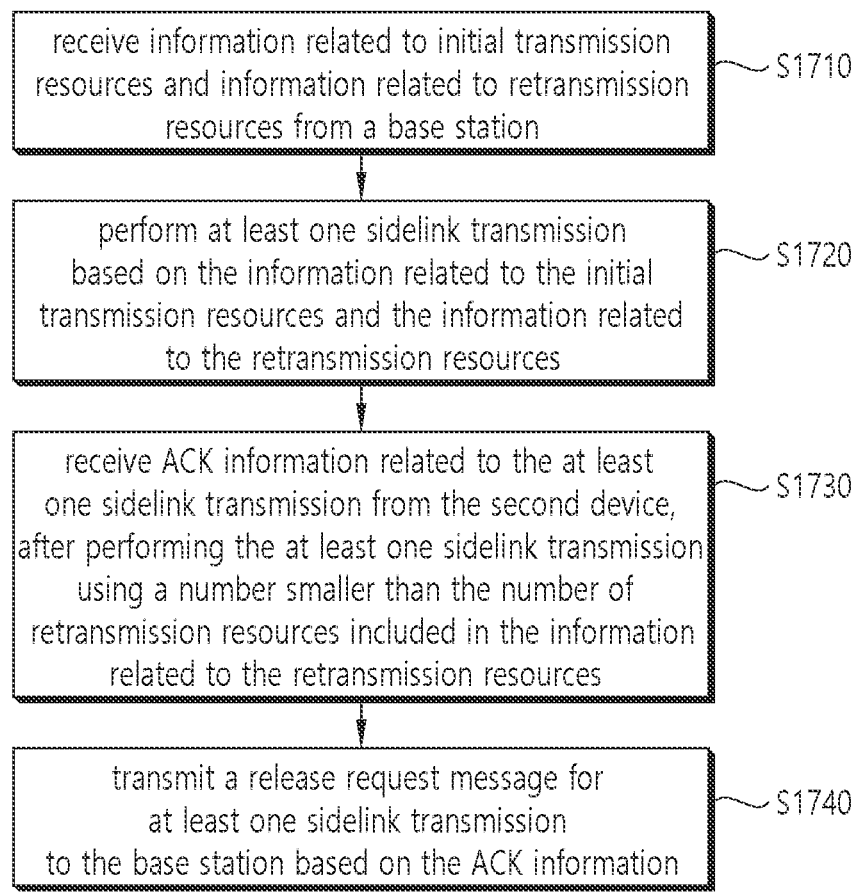
FIG. 17 shows a method for a first device 100 to stop sidelink retransmission to a second device 200 according to an embodiment of the present disclosure.

FIG. 17 shows a method for a first device 100 to stop sidelink retransmission to a second device 200 according to an embodiment of the present disclosure. The embodiment of FIG. 17 may be combined with various embodiments of the present disclosure.

Referring to FIG. 17, in step S1710, the first device 100 may receive information related to initial transmission resources and information related to retransmission resources from a base station. In step S1720, the first device 100 may perform at least one sidelink transmission based on the information related to the initial transmission resources and the information related to the retransmission resources. In step S1730, the first device 100 may receive acknowledgement (ACK) information related to the at least one sidelink transmission from the second device 200, after performing the at least one sidelink transmission using a number smaller than the number of retransmission resources included in the information related to the retransmission resources.

In step S1740, the first device 100 may transmit a release request message for at least one sidelink transmission to the base station based on the ACK information. For example, the at least one sidelink transmission related to the remaining retransmission resources based on the ACK information may be stopped. For example, the first device 100 may transmit a release request message for the at least one sidelink transmission related to the remaining retransmission resources to the base station based on the ACK information. For example, the first device 100 may flush a buffer of the first device 100 for a transport block related to the remaining retransmission resources based on the ACK information.

The above-described embodiment may be applied to various devices to be described below. First, for example, the processor 102 of the first device 100 may control the transceiver 106 to receive information related to initial transmission resources and information related to retransmission resources from a base station. And, the processor 102 of the first device 100 may control the transceiver 106 to perform at least one sidelink transmission based on the information related to the initial transmission resources and the information related to the retransmission resources. And, the processor 102 of the first device 100 may control the transceiver 106 to receive acknowledgement (ACK) information related to the at least one sidelink transmission from the second device 200, after performing the at least one sidelink transmission using a number smaller than the number of retransmission resources included in the information related to the retransmission resources. And, the processor 102 of the first device 100 may control the transceiver 106 to transmit a release request message for at least one sidelink transmission to the base station based on the ACK information.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive information related to initial transmission resources and information related to retransmission resources from a base station, perform at least one sidelink transmission based on the information related to the initial transmission resources and the information related to the retransmission resources, after performing the at least one sidelink transmission using a number smaller than the number of retransmission resources included in the information related to the retransmission resources, receive acknowledgement (ACK) information related to the at least one sidelink transmission from the second device. For example, the at least one sidelink transmission related to the remaining retransmission resources is stopped based on the ACK information.

Since examples of the above-described proposed method may also be included as one of the implementation methods of the present disclosure, it is obvious that they may be regarded as a kind of proposed method. In addition, the above-described proposed methods may be implemented independently, but may also be implemented in the form of a combination (or merge) of some of the proposed methods. The rule may be defined so that the information on whether the proposed methods are applied (or information on the rules of the proposed methods) is notified by the base station to the UE or the transmitting UE to the receiving terminal through a pre-defined signal (e.g., physical layer signal or higher layer signal).

Various embodiments of the present disclosure may be applied not only to vehicle-to-vehicle communication, but also to vehicle-to-pedestrian communication, vehicle-to-base station communication, or vehicle-to-fixed node communication. For example, in communication with a base station, the position and speed of the counterpart receiver may be regarded as fixed.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
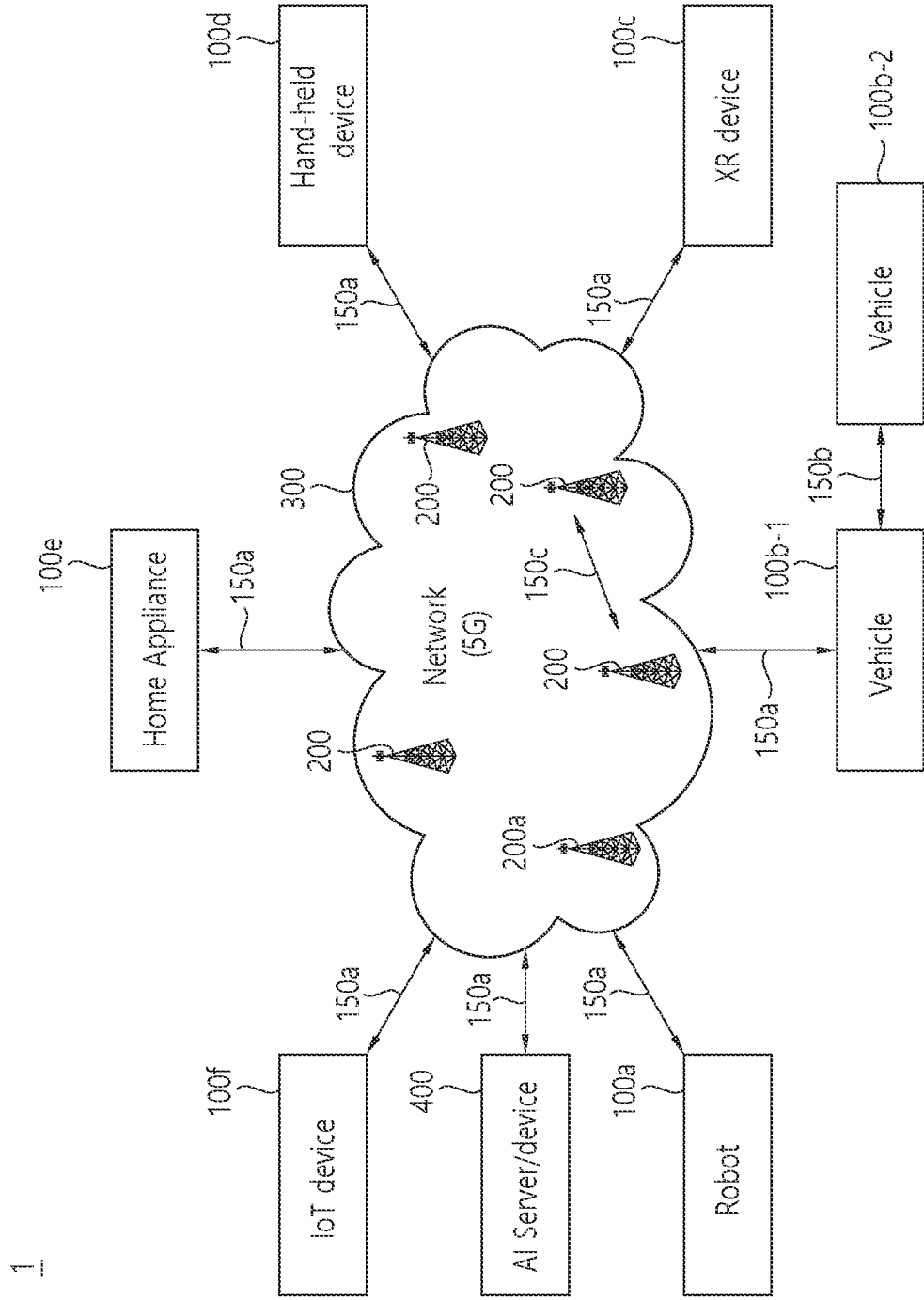
FIG. 18 shows a communication system 1, in accordance with an embodiment of the present disclosure.

FIG. 18 shows a communication system 1, in accordance with an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication(e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
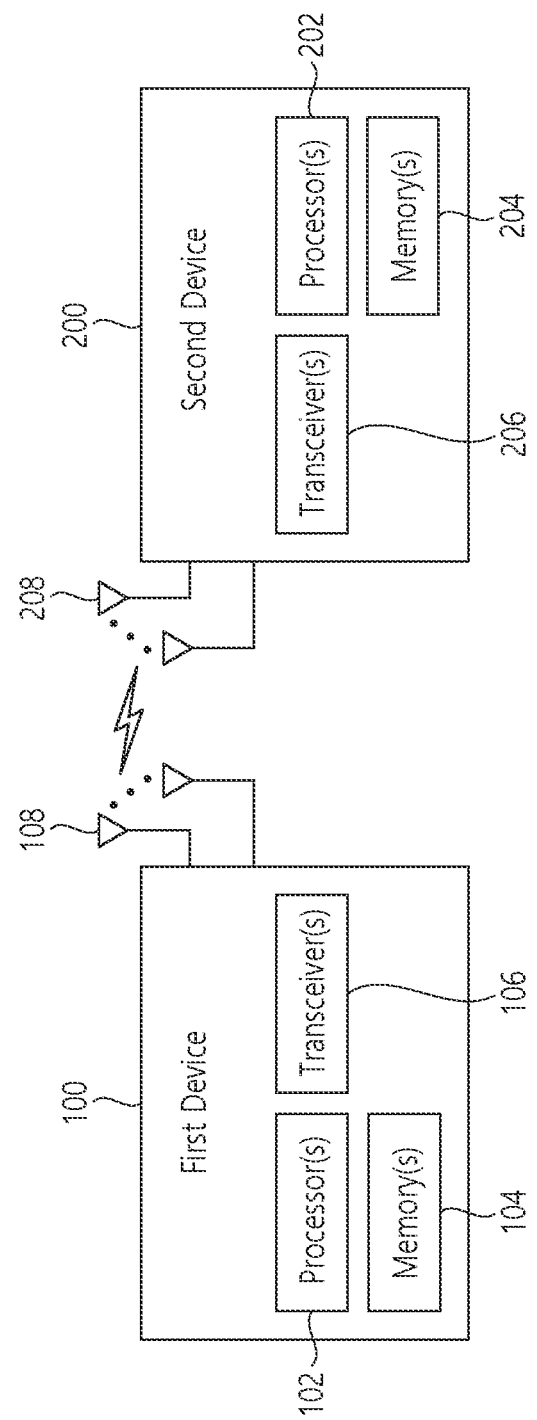
FIG. 19 shows wireless devices, in accordance with an embodiment of the present disclosure.

FIG. 19 shows wireless devices, in accordance with an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
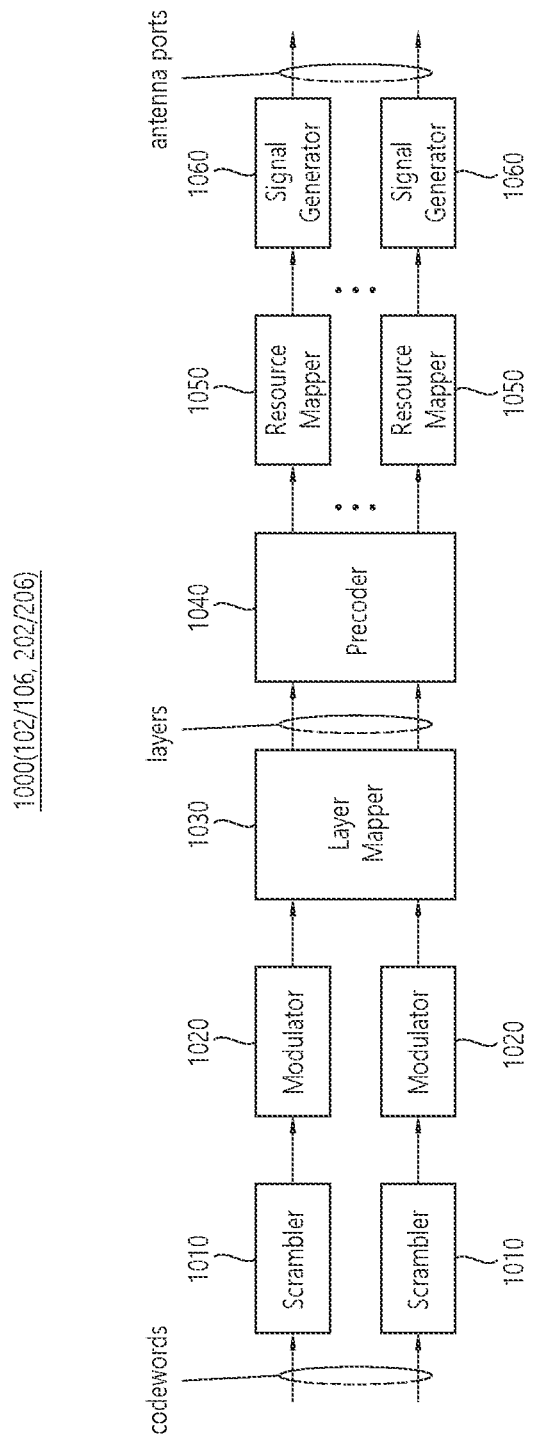
FIG. 20 shows a signal process circuit for a transmission signal, in accordance with an embodiment of the present disclosure.

FIG. 20 shows a signal process circuit for a transmission signal, in accordance with an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
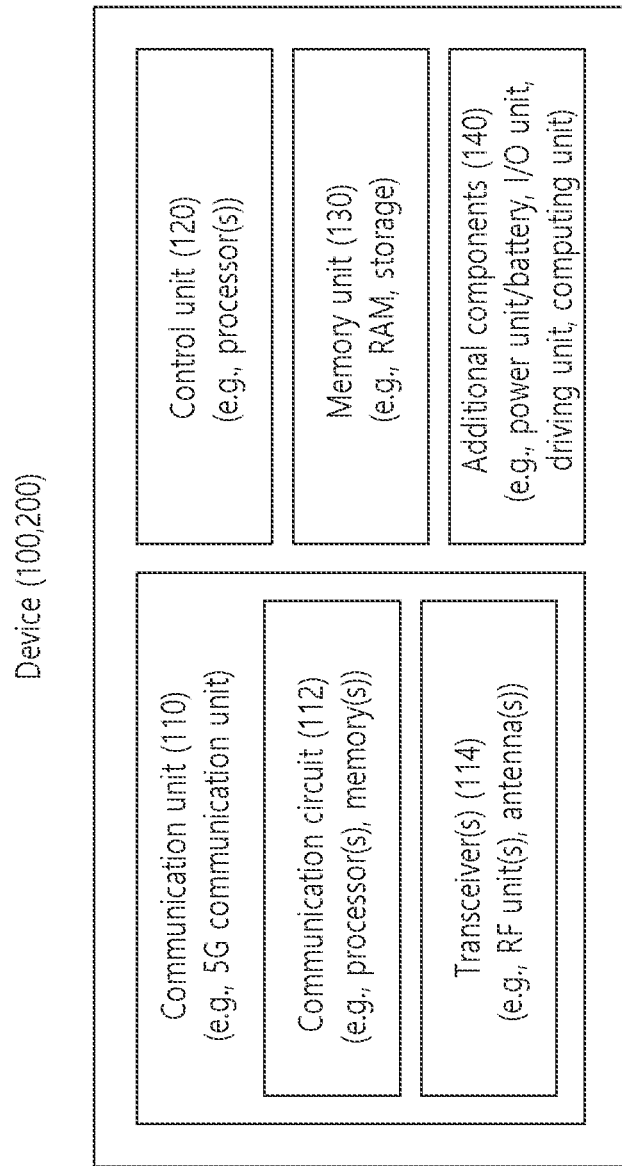
FIG. 21 shows a wireless device, in accordance with an embodiment of the present disclosure.

FIG. 21 shows another example of a wireless device, in accordance with an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
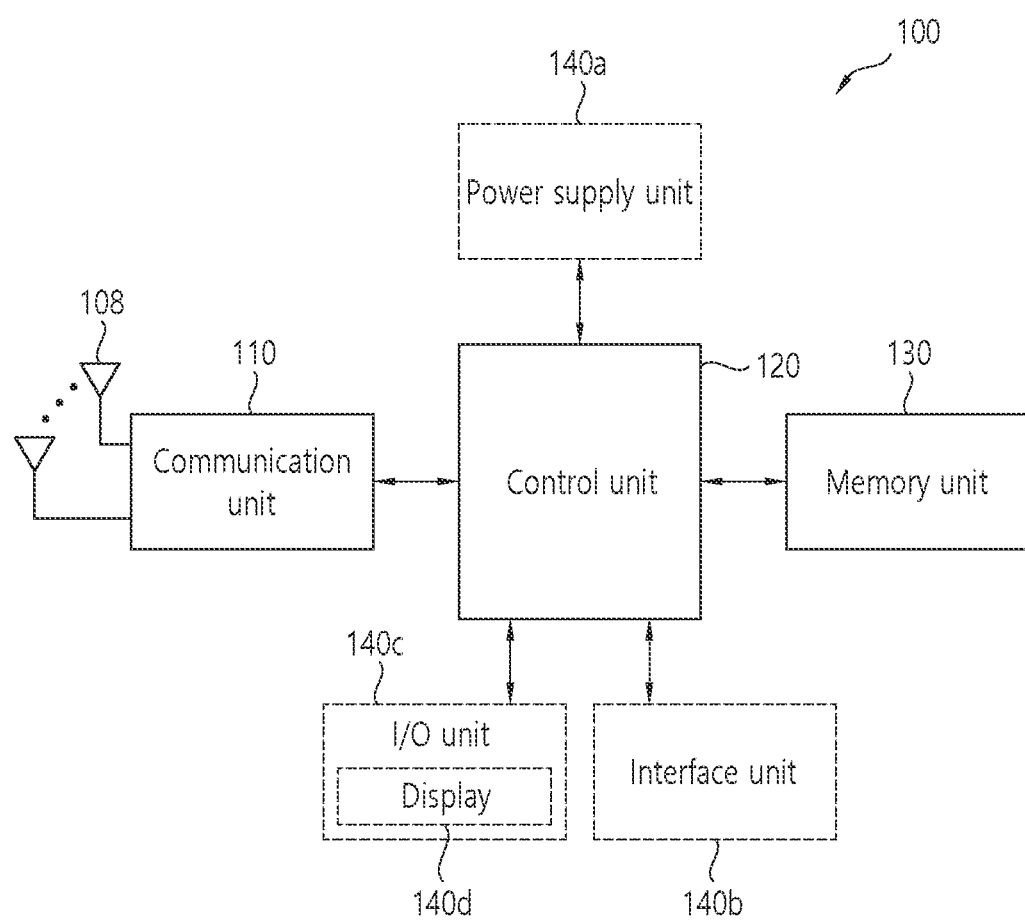
FIG. 22 shows a hand-held device, in accordance with an embodiment of the present disclosure.

FIG. 22 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
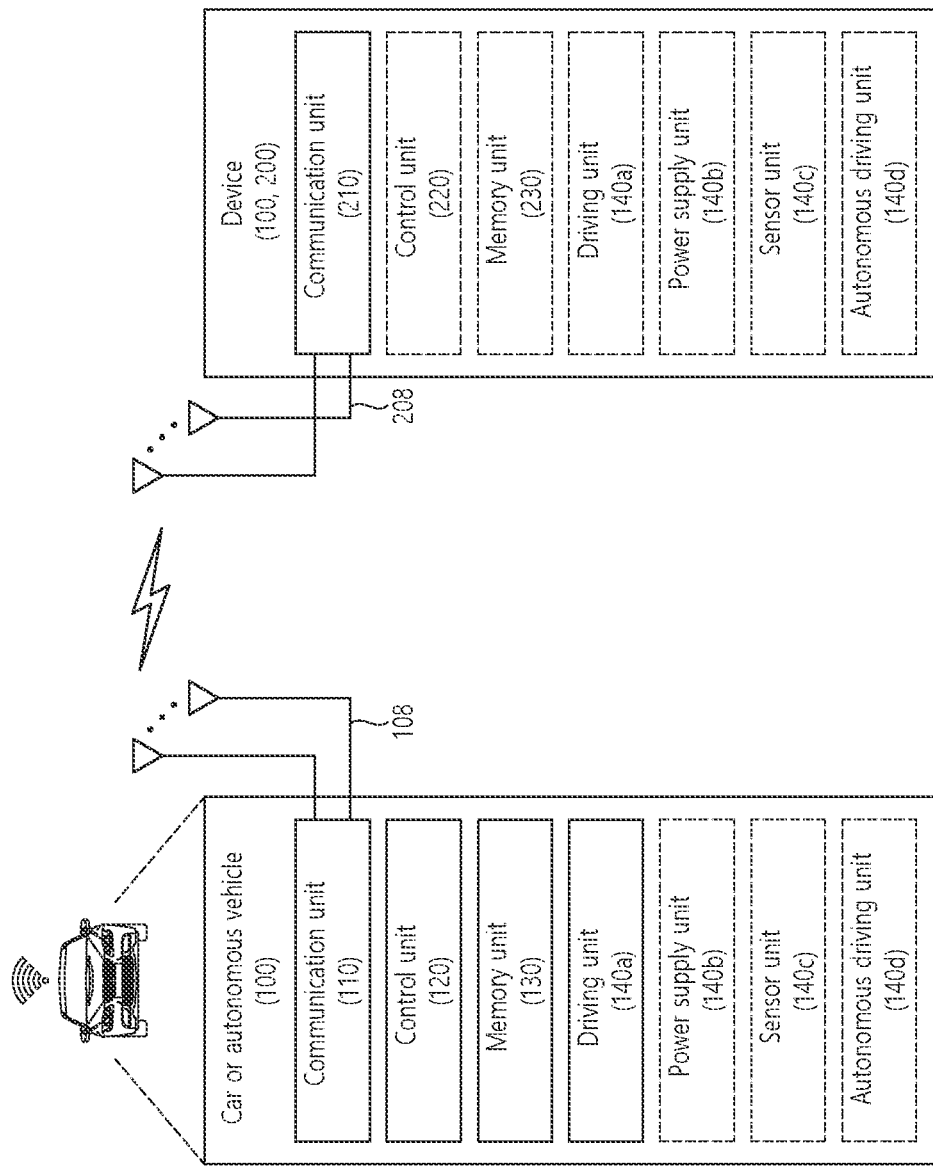
FIG. 23 shows a car or an autonomous vehicle, in accordance with an embodiment of the present disclosure.

FIG. 23 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    performing at least one transmission to a second device;
    receiving negative acknowledgment (NACK) information related to the at least one transmission from the second device; and
    determining whether to transmit a message for requesting retransmission resources based on a pre-configured delay time threshold and a remaining latency budget related to the at least one transmission,
    wherein the pre-configured delay time threshold includes a minimum delay time required for requesting the retransmission resources and allocating the retransmission resources.

2. The method of claim 1, wherein the remaining latency budget related to the at least one transmission is equal to or greater than the pre-configured delay time threshold.

3. The method of claim 2, further comprising:
    transmitting the message for requesting the retransmission resources to a base station based on the remaining latency budget related to the at least one transmission being equal to or greater than the pre-configured delay time threshold.

4. The method of claim 1, wherein the performing at least one transmission to the second device comprises:
    transmitting a number of the retransmission resources determined based on first information related to retransmission to a base station;
    receiving information related to initial transmission resources and second information related to the retransmission resources from the base station; and
    performing the at least one transmission based on the information related to initial transmission resources and the second information related to the retransmission resources;
    wherein the first information includes at least one of channel status information, interference level information, congestion level information, reference signal received power (RSRP) information related to the transmission, reference signal received quality (RSRQ) information related to the transmission or received signal strength indicator (RSSI) information related to the transmission.

5. The method of claim 1, wherein the remaining latency budget related to the at least one transmission is less than the pre-configured delay time threshold.

6. The method of claim 5, wherein the first device determines not to transmit the message for requesting the retransmission resources and the at least one transmission is stopped, based on the remaining latency budget related to the at least one transmission being less than the pre-configured delay time threshold.

7. The method of claim 5, further comprising:
performing a mode 2-based retransmission, based on the remaining latency budget related to the at least one transmission being less than the pre-configured delay time threshold, and
wherein the mode 2-based retransmission is performed based on resources allocated by the first device for transmission to the second device.

8. The method of claim 7, wherein the mode 2-based retransmission is performed based on a channel busy ratio (CBR) measurement value related to the at least one transmission being equal to or less than a pre-configured threshold value.

9. The method of claim 7, wherein the mode 2-based retransmission is performed based on a channel quality value related to the at least one transmission being greater than a pre-configured threshold value.

10. The method of claim 7, wherein the mode 2-based retransmission is stopped based on a channel quality value related to the at least one transmission being equal to or less than a pre-configured threshold value.

11. The method of claim 1, wherein the message for requesting the retransmission resources is any one of a scheduling request or hybrid automatic repeat request (HARQ) NACK information received from the second device.

12. The method of claim 1, wherein the performing at least one transmission to the second device comprises:
transmitting first information related to retransmission to a base station;
receiving information related to initial transmission resources and second information related to the retransmission resources from the base station; and
performing the at least one transmission based on the information related to initial transmission resources and the second information related to the retransmission resources,
wherein the first information includes at least one of channel status information, interference level information, congestion level information, reference signal received power (RSRP) information related to the transmission, reference signal received quality (RSRQ) information related to the transmission or received signal strength indicator (RSSI) information related to the transmission, and
wherein the second information includes a number of the retransmission resources determined based on the first information.

13. A processing device adapted to control a first device to perform wireless communication, the processing device comprising:
at least one processor; and
at least one memory connected to the at least one processor and storing instructions that, based on being executed, cause the at least one processor to perform operations comprising:
performing at least one transmission to a second device;
receiving negative acknowledgment (NACK) information related to the at least one transmission from the second device; and
determining whether to transmit a message for requesting retransmission resources based on a pre-configured delay time threshold and a remaining latency budget related to the at least one transmission,
wherein the pre-configured delay time threshold includes a minimum delay time required for requesting the retransmission resources and allocating the retransmission resources.

14. A first device for performing wireless communication, the first device comprising:
at least one transceiver;
at least one processor; and
at least one memory connected to the at least one processor and storing instructions that, based on being executed, cause the first device to perform operations comprising:
performing at least one transmission to a second device;
receiving negative acknowledgment (NACK) information related to the at least one transmission from the second device; and
determining whether to transmit a message for requesting retransmission resources based on a pre-configured delay time threshold and a remaining latency budget related to the at least one transmission,
wherein the pre-configured delay time threshold includes a minimum delay time required for requesting the retransmission resources and allocating the retransmission resources.

* * * * *